United States Patent
Tofighbakhsh

(10) Patent No.: US 9,730,063 B2
(45) Date of Patent: *Aug. 8, 2017

(54) NETWORK ACCESS VIA TELEPHONY SERVICES

(71) Applicant: AT&T INTELLECTUAL PROPERTY I, L.P., Atlanta, GA (US)

(72) Inventor: Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/842,378

(22) Filed: Sep. 1, 2015

(65) Prior Publication Data

US 2015/0373544 A1 Dec. 24, 2015

Related U.S. Application Data

(63) Continuation of application No. 12/965,390, filed on Dec. 10, 2010, now Pat. No. 9,154,953.

(51) Int. Cl.
*H04W 12/08* (2009.01)
*H04W 12/06* (2009.01)
(Continued)

(52) U.S. Cl.
CPC .......... *H04W 12/06* (2013.01); *H04L 63/101* (2013.01); *H04W 12/04* (2013.01); *H04W 12/08* (2013.01);
(Continued)

(58) Field of Classification Search
CPC ......... H04L 12/04; H04L 12/06; H04L 12/08; H04L 63/00–63/0218; H04L 63/04;
(Continued)

(56) References Cited

U.S. PATENT DOCUMENTS 5,990,810 A * 11/1999 Williams .............. G06F 3/0608
341/51
6,076,078 A 6/2000 Camp et al.
(Continued)

OTHER PUBLICATIONS

Squire, Jonathan, Universal Plug and Play IGD, "A Fox in the Hen House," www.bigbrainlabs.com, Aug. 8, 2008, pp. 1-19.
(Continued)

*Primary Examiner* — Eric W Shepperd
(74) *Attorney, Agent, or Firm* — Toler Law Group, PC

(57) ABSTRACT

A method includes receiving, by a computing system of a first wireless network from a first device, a request to access a second wireless network secured with a network encryption key. The method includes determining that a user account associated with the first device permits access to the second wireless network. The method includes sending, to a registration device, a token that is usable by a second device to access the network encryption key. The method includes sending, via the first wireless network, the token to the first device for transmission of the token to the second device. The transmission of the token from the first device to the second device enables the second device to send a hash value based on the token to the registration device. The hash value enables the registration device to provide access to the network encryption key to the second device.

20 Claims, 13 Drawing Sheets

(51) Int. Cl.
*H04W 12/04* (2009.01)
*H04W 48/02* (2009.01)
*H04W 60/04* (2009.01)
H04L 29/06 (2006.01)

(52) U.S. Cl.
CPC .......... *H04W 48/02* (2013.01); *H04W 60/04* (2013.01); *H04L 63/062* (2013.01); *H04L 63/068* (2013.01); *H04L 63/0807* (2013.01)

(58) Field of Classification Search
CPC . H04L 63/0428; H04L 63/0492; H04L 63/06; H04L 63/062; H04L 63/08–63/083; H04L 63/0853; H04L 63/0876; H04L 63/10; H04L 63/101; H04L 63/107; H04L 9/08; H04L 9/0819; H04L 9/088; H04L 9/0894; H04L 2209/80
See application file for complete search history.

(56) References Cited

U.S. PATENT DOCUMENTS

| | | | |
|---|---|---|---|
| 6,144,849 A | 11/2000 | Nodoushani et al. | |
| 6,885,362 B2 | 4/2005 | Suomela | |
| 7,054,627 B1 | 5/2006 | Hillman | |
| 7,428,413 B2* | 9/2008 | Fink | H04L 63/10 455/432.1 |
| 8,224,246 B2* | 7/2012 | Suumaki | G06K 7/10237 455/41.1 |
| 8,347,355 B2 | 1/2013 | Mower et al. | |
| 8,474,017 B2* | 6/2013 | Schultz | G06F 21/41 726/4 |
| 2002/0174335 A1 | 11/2002 | Zhang et al. | |
| 2004/0066764 A1 | 4/2004 | Koodli et al. | |
| 2004/0073688 A1 | 4/2004 | Sampson | |
| 2006/0039348 A1 | 2/2006 | Racz et al. | |
| 2006/0079113 A1 | 4/2006 | Minich | |
| 2006/0233375 A1 | 10/2006 | Lillie et al. | |
| 2006/0236384 A1 | 10/2006 | Lindholm et al. | |
| 2007/0002819 A1* | 1/2007 | Sood | H04W 28/26 370/348 |
| 2007/0053508 A1 | 3/2007 | Yasumoto | |
| 2007/0079113 A1 | 4/2007 | Kulkarni et al. | |
| 2008/0132219 A1 | 6/2008 | Bisdikian et al. | |
| 2008/0240068 A1 | 10/2008 | Ishimoto | |
| 2008/0256600 A1* | 10/2008 | Schrijen | G06F 21/86 726/2 |
| 2008/0313456 A1 | 12/2008 | Menadue et al. | |
| 2009/0023474 A1 | 1/2009 | Luo et al. | |
| 2009/0055514 A1 | 2/2009 | Tebbs et al. | |
| 2009/0109897 A1 | 4/2009 | Woo | |
| 2009/0125412 A1 | 5/2009 | Watson et al. | |
| 2009/0129347 A1 | 5/2009 | Woo | |
| 2009/0217033 A1 | 8/2009 | Costa et al. | |
| 2009/0217048 A1* | 8/2009 | Smith | H04L 63/06 713/176 |
| 2009/0222659 A1 | 9/2009 | Miyabayashi et al. | |
| 2009/0240815 A1 | 9/2009 | Han et al. | |
| 2009/0265775 A1 | 10/2009 | Wisely et al. | |
| 2009/0287798 A1 | 11/2009 | Law et al. | |
| 2009/0327724 A1 | 12/2009 | Shah et al. | |
| 2010/0166186 A1 | 7/2010 | Shiba | |
| 2010/0190472 A1 | 7/2010 | Gorthi et al. | |
| 2010/0291952 A1 | 11/2010 | Gosset et al. | |
| 2011/0030047 A1 | 2/2011 | Gao et al. | |
| 2011/0099107 A1 | 4/2011 | Saxena et al. | |
| 2011/0143714 A1* | 6/2011 | Keast | H04W 12/06 455/411 |
| 2011/0191237 A1* | 8/2011 | Faith | G06F 1/1694 705/39 |
| 2011/0283110 A1 | 11/2011 | Dapkus et al. | |
| 2012/0214443 A1 | 8/2012 | Daigle | |

OTHER PUBLICATIONS

Wi-Fi Alliance, "Wi-Fi Protected Setup Specification Version 1.0h", Retrieved on Jul. 19, 2013, Retrieved from http://gpl.back2roots.org/source/puma5/netgear/CG3200-1TDNDS_GPL/ap/apps/wpa2/original/Wi-Fi%20Protected%20Setup%Specification%201.0h.pdf, 110 pages.

Windows Connect Now-NET, A Windows Rally Specification, http://www.microsoft.com/rally, Dec. 8, 2006, Version 1.1, pp. 1-74.

* cited by examiner

| Configuration 6030 | | | | |
|---|---|---|---|---|
| Source address information 7010 | Destination address information 7020 | Service information 7030 | Direction information 7040 | Permission information 7050 |
| Source address information 7011 | Destination address information 7021 | Service information 7031 | Direction information 7041 | Permission information 7051 |
| Source address information 7012 | Destination address information 7022 | Service information 7032 | Direction information 7042 | Permission information 7052 |
| Source address information 7013 | Destination address information 7023 | Service information 7033 | Direction information 7043 | Permission information 7053 |
| Source address information 7014 | Destination address information 7024 | Service information 7034 | Direction information 7044 | Permission information 7054 |
| Source address information 7015 | Destination address information 7025 | Service information 7035 | Direction information 7045 | Permission information 7055 |

FIG. 7

NETWORK ACCESS VIA TELEPHONY SERVICES

PRIORITY CLAIM

This application claims priority from, and is a continuation of, U.S. patent application Ser. No. 12/965,390, filed on Dec. 10, 2010, which is incorporated herein by reference in its entirety.

FIELD OF THE DISCLOSURE

This disclosure relates generally to the field of wireless data communication utilizing at least two different wireless networks and, more specifically, this disclosure pertains to the field of providing access to wireless networks that use a security measure.

BACKGROUND

Some networks used for mobile device communications are facing increasing amounts of data traffic beyond available capacities. One possible remedy to this issue has been to offload and/or reroute data communications to existing WiFi hotspots where a mobile device could automatically detect a WiFi access point at a WiFi hotspot and connect to an available network. However, a WiFi access point can employ a security measure such as WiFi protected access (WPA) or wired equivalent privacy (WEP) to secure a wireless computer network provided by the WiFi access point. This creates an issue for a possible user of the wireless computer network, since the possible user may not readily have the encryption key (e.g., a string of characters) used in permitting a computing device to access the wireless computer network. For this and other reasons, using a security measure to secure the wireless computer network provided by the WiFi access point renders offloading and/or rerouting data communications (e.g. data communications of a cellular telephone network) to existing WiFi hotspots difficult, if not impossible.

BRIEF DESCRIPTION OF THE DRAWINGS

The preferred embodiments will become apparent upon reading the following detailed description and upon reference to the accompanying drawings in which:

FIG. 7 provides a block diagram of an access control list configuration, according to one or more embodiments;

Figure 1:
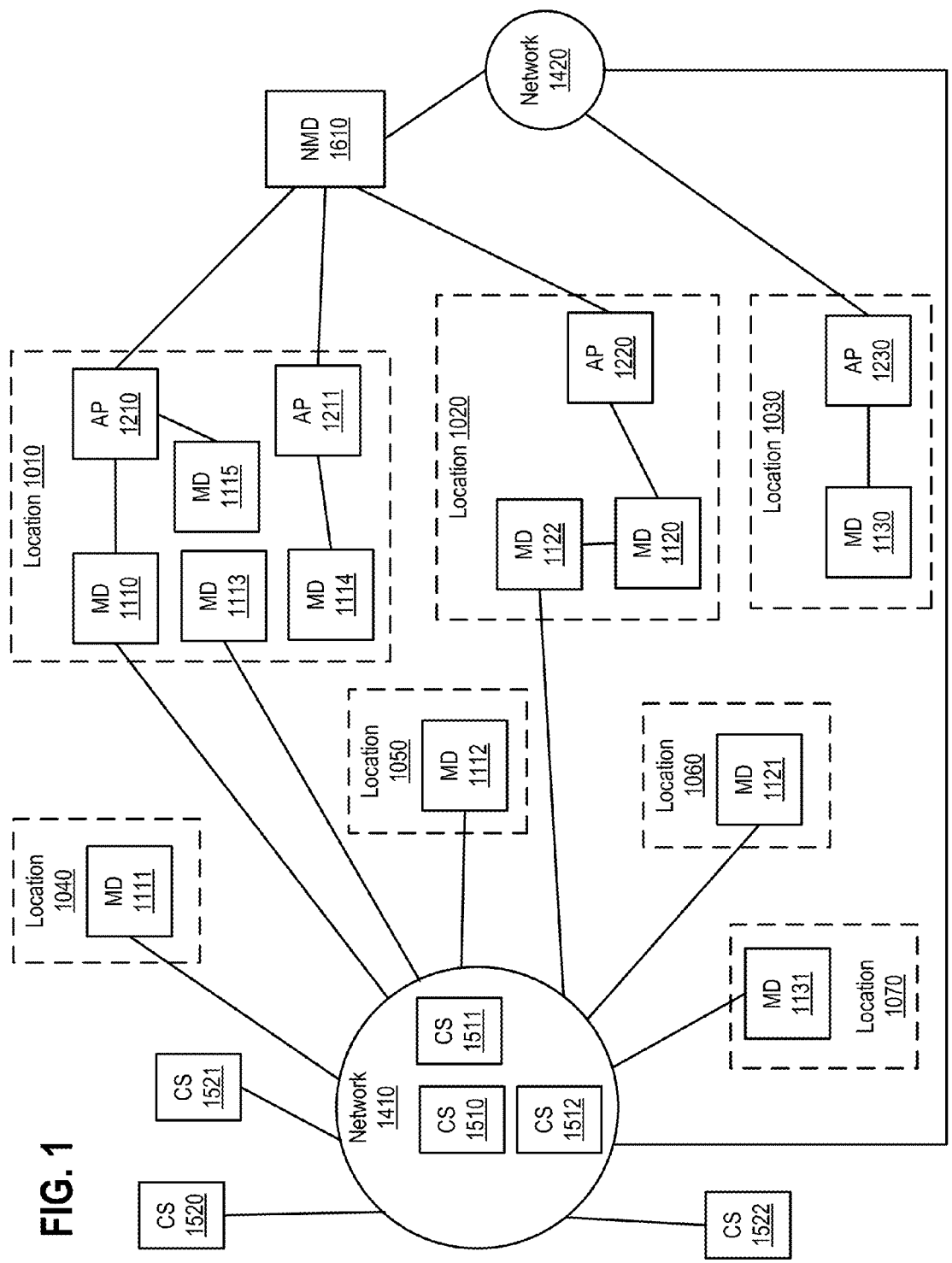
FIG. 1 provides a block diagram a block diagram of one or more network communications systems, according to one or more embodiments.

While the invention may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of an invention as defined by appended claims

DETAILED DESCRIPTION

FIG. 1 illustrates a block diagram of one or more network communications systems, according to one or more embodiments. As shown, one or more locations 1010-1030 can respectively include wireless access points (APs) 1210 and 1211, wireless access point (AP) 1220, and wireless AP 1230. In one or more embodiments, locations 1010-1030 can include one or more of businesses, hotels, homes, airports, restaurants, geographic regions, planes, trains, automobiles, and coffee shops, among others. In one or more embodiments, one or more of wireless APs 1210-1230 can be coupled to a network 1420 and can provide communications access of network 1420 to one or more devices coupled to the respective wireless AP.

In one or more embodiments, a mobile device (MD) (e.g., a MD of mobile devices 1110-1131) can communicate, when within a communications range, with a wireless AP (e.g., a wireless AP of wireless APs 1210-1230) using one or more of Institute of Electrical and Electronics Engineers (IEEE) 802.16, IEEE 802.11, IEEE 802.15, IEEE 802.15.4, a Zig-Bee® standard (ZigBee® is a registered trademark of the Zigbee Alliance), wireless Ethernet, ultra wide band, wireless universal serial bus (USB) and/or infrared communication technologies, among others. For example, the MD can communicate with the wireless AP when the MD is located at a location that includes the wireless AP or includes wireless coverage from the wireless AP. In one or more embodiments, a location can be described and/or defined by an area or volume where communication is possible with one or more wireless APs.

In one or more embodiments, one or more wireless APs can include and/or implement a wireless local area network (WLAN) that can be accessed by one or more mobile devices (MDs). In one or more embodiments, a wireless AP can include a transceiver to communicate with one or more MDs using one or more wireless methods, processes, protocols, and/or wireless spectrums (e.g., frequency ranges). In one example, a wireless AP can communicate with one or more MDs using one or more ISM (industrial, scientific and medical) bands. For instance, an ISM band can include a frequency range of 6.765-6.795 Mhz, 433.05-434.79 Mhz, 902-928 Mhz, 2.4-2.5 Ghz, 5.725-5.875 Ghz, or 24.0-24.25 Ghz, among others.

In one or more embodiments, a WLAN can be secured via one or more encryption keys. In one example, one or more wireless APs can use a Wired Equivalent Privacy (WEP) encryption key and/or protocol to implement the WLAN. In a second example, one or more wireless APs can use a Wi-Fi Protected Access (WPA) (e.g., WPA version 1, WPA version 2, etc.) encryption key and/or protocol to implement the WLAN. In another example, one or more wireless APs can use multiple WPA encryption keys to implement the WLAN. For instance, each of the one or more wireless APs can use multiple WPA encryption keys to implement the WLAN. In one or more embodiments, each of the one or more wireless APs can communicate with multiple different MDs and can use different WPA encryption keys to communicate with the different MDs. For example, a wireless AP (e.g., AP 1210) can communicate with a first MD (e.g., MD 1110) using a first WPA encryption key and can concurrently communicate with a second MD (e.g., MD 1115) using a second, different, WPA encryption key.

In one or more embodiments, a MD can access the WLAN, which can be secured via one or more encryption keys using a Wi-Fi Protected Setup (WPS) protocol. For example, a wireless AP and a registrar can utilize the WPS protocol to provide the MD with configuration data that can be utilized by the MD to communicate with the WLAN and/or the wireless AP. For instance, the configuration data can include one or more WLAN settings (e.g., service set identifier (SSID), etc.) and/or an encryption key that is usable by the MD to access the WLAN, which can be secured via one or more encryption keys. In one or more embodiments, a user of the MD can obtain a token (e.g., one or more of an access code, a string of characters, a username, a password, etc.) from a network provider and use the token in gaining access to the WLAN for the MD.

In one example, the user can obtain the token via a mobile telephone network (e.g., network 1410) via a first MD (e.g., MD 1113) and can input the token into a second MD (e.g., MD 1115) so that the second MD can communicate with the WLAN and/or a wireless AP (e.g., AP 1210) that is utilized in implementing the WLAN. In a second example, the user can obtain the token via a mobile telephone network (e.g., network 1410) via a MD (e.g., MD 1110), and the MD can utilize the token so that the MD can communicate with the WLAN and/or a wireless AP (e.g., AP 1210) that is utilized in implementing the WLAN. In another example, the user can obtain the token via a mobile telephone network (e.g., network 1410) via a first MD (e.g., MD 1122) coupled to a second MD (e.g., MD 1120), and the second MD can receive the token from the first MD so that the second MD can communicate with the WLAN and/or a wireless AP (e.g., AP 1220) that is utilized in implementing the WLAN.

In one instance, the first MD (e.g., a mobile wireless telephony device) can be coupled to the second MD (e.g., a laptop computer system) utilizing one or more wired systems, methods, and/or processes. For example, the first MD can be coupled to the second MD utilizing one or more USB systems, methods, and/or processes. In another instance, the first MD (e.g., a mobile wireless telephony device) can be coupled to the second MD (e.g., a laptop computer system) utilizing one or more wireless systems, methods, and/or processes. For example, the first MD can be coupled to the second MD utilizing one or more wireless personal area network (PAN) systems, methods, and/or processes such as those associated with a Bluetooth® specification (Bluetooth® is a registered trademark of Bluetooth SIG, Inc.), IEEE 802.15, IEEE 802.15.4, a ZigBee® standard (ZigBee is a registered trademark of the Zigbee Alliance), infrared signaling, etc.

In one or more embodiments, one or more systems, methods, and/or processes described herein that use and/or implement the WPS protocol and/or associated systems, methods, and/or processes may not be limited to Wi-Fi or IEEE 802.11 wireless networks and/or associated protocols or specifications. For example, one or more systems, methods, and/or processes described herein that use and/or implement the WPS protocol and/or associated systems, methods, and/or processes can be utilized in and/or adapted for one or more other wireless networks based on other wireless network protocols and/or specifications such as IEEE 802.16, IEEE 802.15, IEEE 802.15.4, a ZigBee® standard (ZigBee® is a registered trademark of the Zigbee Alliance), ultra wide band, and/or wireless USB, among others.

As illustrated, MDs 1110 and 1115 can be coupled to network 1420 via wireless AP 1210 and a network management device (NMD) 1610, where wireless AP 1210 can be coupled to NMD 1610. In one or more embodiments, NMD 1610 can provide authentication, quality of service (QoS), communication traffic shaping, and/or access control from one or more computing devices (e.g., MDs 1110-1120) and/or one or more wireless APs 1210-1220 to network 1420. In one example, NMD 1610 can be or include a registrar that can permit and/or revoke access to one or more wireless local area networks (WLANs) secured with one or more encryption keys. In another example, NMD 1610 can include an access control list (ACL) that can be modifiable, and NMD 1610 can use the ACL to permit and/or deny access of one or more computing devices (e.g., MDs 1110-1120) to network 1420. In one or more embodiments, NMD 1610 can perform one or more processes and/or methods that can modify the ACL. In one or more embodiments, NMD 1610 can receive one or more signals from a remote signaling device, and the ACL of NMD 1610 can be modified based on the received one or more signals from the remote signaling device.

In one or more embodiments, signals and/or signaling can be used in communicating establishment and/or control of communications and/or access to a network and/or resources of the network. In one or more embodiments, signals and/or signaling can be used between two different network providers and/or between two systems of a single network provider. In one example, a first network provider can be or include a second network provider, and signals and/or signaling can be used between the first network provider and the second network provider can mean signaling between two systems of the first network provider. In one or more embodiments, signals and/or signaling can be used to convey information (e.g., configuration messages, accounting messages, control data, etc.) that is different than user information transfer (e.g., a telephone conversation between two users, a text message communication between two users, etc.).

As shown, MD 1120 can be coupled to network 1420 via wireless AP 1220 and NMD 1610, and MD 1130 can be coupled to network 1420 via wireless AP 1230. In one or more embodiments, one or more MDs (e.g., MDs 1110, 1115, 1120, and 1130) can be coupled to network 1420 after being coupled to a respective WLAN and/or wireless AP. For example, the one or more MDs can be coupled to a respective WLAN after utilizing respective configuration data received from a respective registrar.

In one or more embodiments, network 1420 can provide access and/or services of one or more other networks (e.g., including an Internet) to one or more MDs via one or more wireless APs. In one or more embodiments, access to these other networks can include one or more "services" these other networks may provide. For example, these one or more services can include one or more of: email, world wide web (WWW), file transfer, printing, file sharing, file system sharing, remote file system, network file system (NFS), news, multicast, netbios, encryption, domain name service (DNS), routing, tunneling, chat such as Internet Remote Chat and/or AOL Instant Messenger® service (AOL Instant Messenger® is a registered trademark of AOL LLC Limited Liability Company), gaming, licensing, license management, digital rights management, network time, remote desktop, remote windowing, audio, database (e.g., an Oracle® database (Oracle® is a registered trademark of the Oracle Corporation), a Microsoft® SQL Server® database (Microsoft® and SQL Server® are either registered trademarks or trademarks of Microsoft Corporation in the United States and/or other countries), a MySQL® database (MySQL® is a registered trademark of MySQL AB A Company (An "Aktiebolag"), a PostgreSQL database, etc.), authentication, accounting, authorization, virtual local area network (VLAN) (e.g., IEEE 802.1q), virtual private network or VPN, audio, phone, Voice Over Internet Protocol (VoIP), paging, and video, among others.

In one or more embodiments, the one or more service can utilize, be associated with, and/or correspond to one or more protocols of one or more computer and/or software applications. For example, the one or more protocols can include one or more of Internet protocol (IP), transmission control protocol (TCP), user datagram protocol (UDP), address resolution protocol (ARP), hypertext transfer protocol (HTTP), secure HTTP (HTTPS), network control protocol (NCP), network time protocol (NTP), serial line Internet protocol (SLIP), simple mail transfer protocol (SMTP), simple network management protocol (SNMP), bootstrap protocol (BOOTP), connectionless network protocol (CLNP), dynamic host configuration protocol (DHCP), external gateway protocol (EGP), Internet group management protocol (IGMP), and point-to-point protocol (PPP), among others.

In one or more embodiments, a wireless AP can provide authentication, accounting, authorization, QoS, communication traffic shaping, and/or access control from one or more devices coupled to the wireless AP. In one example, wireless AP 1230 can be or include a registrar that can permit and/or revoke access to one or more WLANs secured with one or more encryption keys. In another example, wireless AP 1230 can include an ACL that can be modifiable, and wireless AP 1230 can use the ACL to permit and/or deny access of one or more MDs to network 1420 and/or services associated with network 1420. In one or more embodiments, wireless AP 1230 can perform one or more processes and/or methods that can modify the ACL.

In one or more embodiments, wireless AP 1230 can receive one or more signals from a remote signaling device (e.g., an access control server), and the ACL of wireless AP 1230 can be modified based on the received one or more signals from the remote signaling device. In one or more embodiments, signals and/or signaling can be used in communicating establishment and/or control of communications and/or access to a network, service(s) of the network, and/or resources of the network. For example, the signals and/or signaling can include and/or be based on one or more of Signaling System No. 7 (SS7), Common Channel Signaling System 7 (CCSS7), Universal Plug and Play (UPnP), and RADIUS (Remote Authentication Dial In Service), among others.

As illustrated, MDs 1110-1113, 1121, 1122, and 1131 can be coupled to network 1410. As shown, MDs 1110 and 1113 can be at location 1010; MD 1122 can be at location 1020; MD 1111 can be at location 1040; MD 1112 can be at location 1050; MD 1121 can be at location 1060; and MD 1131 can be at location 1070. In one or more embodiments, network 1410 can be and/or implement a telecommunications network. For instance, network 1410 can be and/or implement a wireless telecommunications network that can support one or more wireless telecommunications network protocols such as one or more of General Packet Radio Service (GPRS), enhanced data rates for GSM evolution (EDGE), long term evolution (LTE), CDMA (code division multiple access), TDMA (time division multiple access), and FDMA (frequency division multiple access), among others.

As shown, network 1410 can include one or more computer systems 1510-1512 and/or can be coupled to one or more computer systems 1520-1522 that can implement one or more functionalities, methods, and/or processes associated with network 1410. In one or more embodiments, network 1410 can be coupled to and/or include a telephony network that can include a wireless cellular telecommunications network and/or a wireless satellite telecommunications network. In one or more embodiments, the telephony network can communicate information such as voice and/or data.

In one or more embodiments, one or more of MDs 1110-1131 can communicate with network 1410 in a wireless fashion. In one or more embodiments, network 1410 provides access and/or services of one or more other networks at a lower data rate than a network 1420 can provide to one or more of MDs 1110-1131. For example, network 1410 can include less bandwidth than network 1420. In one or more embodiments, network 1410 can provide access and/or services of one or more other networks (e.g., including an Internet) to one or more MDs. For example, network 1410 can provide access and/or services of one or more other networks (e.g., including an Internet) to one or more MDs via one or more cellular telephone towers and/or one or more satellites. In one or more embodiments, access to these other networks can include one or more "services" these other networks may provide. In one or more embodiments, the one or more service can utilize, be associated with, and/or correspond to one or more protocols of one or more computer and/or software applications. For example, the one or more "services" these other networks may provide and/or the one or more protocols can be described with reference to network 1420. In one or more embodiments, network 1410 can be coupled to network 1420.

In one or more embodiments, network 1410 and/or network 1420 can include a wired network, a wireless network or a combination of wired and wireless networks. Network 1410 and/or network 1420 can include and/or be coupled to various types of communications networks, such as a public switched telephone network (PSTN), an Internet, a wide area network (WAN) (e.g., a private WAN, a corporate WAN, a public WAN, etc.), a local area network (LAN), etc. In one or more embodiments, a wireless AP can be coupled to a PSTN, e.g., via Ethernet, DSL (digital subscriber line), T-1, etc.; a cable (television) based network; a satellite-based system; and/or a fiber based network; among others. In one or more embodiments, network 1410 and/or network 1420 can include one or more wireless networks, e.g., based on IEEE 802.11, IEEE 802.16 and/or LTE, among others. For instance, one or more of wireless APs 1210-1230 can be coupled to network 1420 in a wireless fashion. Network 1410 and/or network 1420 can include one or more DSL and/or cable (e.g., cable television) networks and/or infrastructures. For example, network 1410 and/or network 1420 can include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In one or more embodiments, network 1420 may form part of the Internet, or may couple to other networks, e.g., other local or wide area networks such as the Internet. In one or more embodiments, a wireless AP can be a system operable to be coupled to and/or include networking equipment usable to couple the wireless AP to network 1420. In one example, wireless AP 1210 can include a wired interface that can be coupled to a gateway device. For instance, the gateway device can include a cable modem, a DSL modem, a router, a network bridge, etc., and the wired interface of wireless AP 1210 can be coupled to the gateway device via Ethernet, FDDI (fiber distributed data interface), etc.

In one or more embodiments, each MD of MDs 1110-1131 can include and/or can be coupled to one or more transceivers that allow the MD to communicate with network 1410 and/or a wireless AP of wireless APs 1210-1230. For example, MD 1110 can include or be coupled to a first transceiver that can communicate with network 1410 and/or include or be coupled to a second transceiver to communicate with wireless AP 1210. For instance, MD 1110 can include or be coupled to a first transceiver that can communicate with a cellular telephone tower (e.g., a base transceiver station) of or coupled to network 1410 and/or include or be coupled to a second transceiver (e.g., a wireless Ethernet transceiver) to communicate with wireless AP 1210. For instance, MD 1110 can communicate voice data via the first transceiver and IP data (e.g., email data, WWW data, streaming audio data, streaming video data, user application data, etc.) via the second transceiver.

Figure 2:
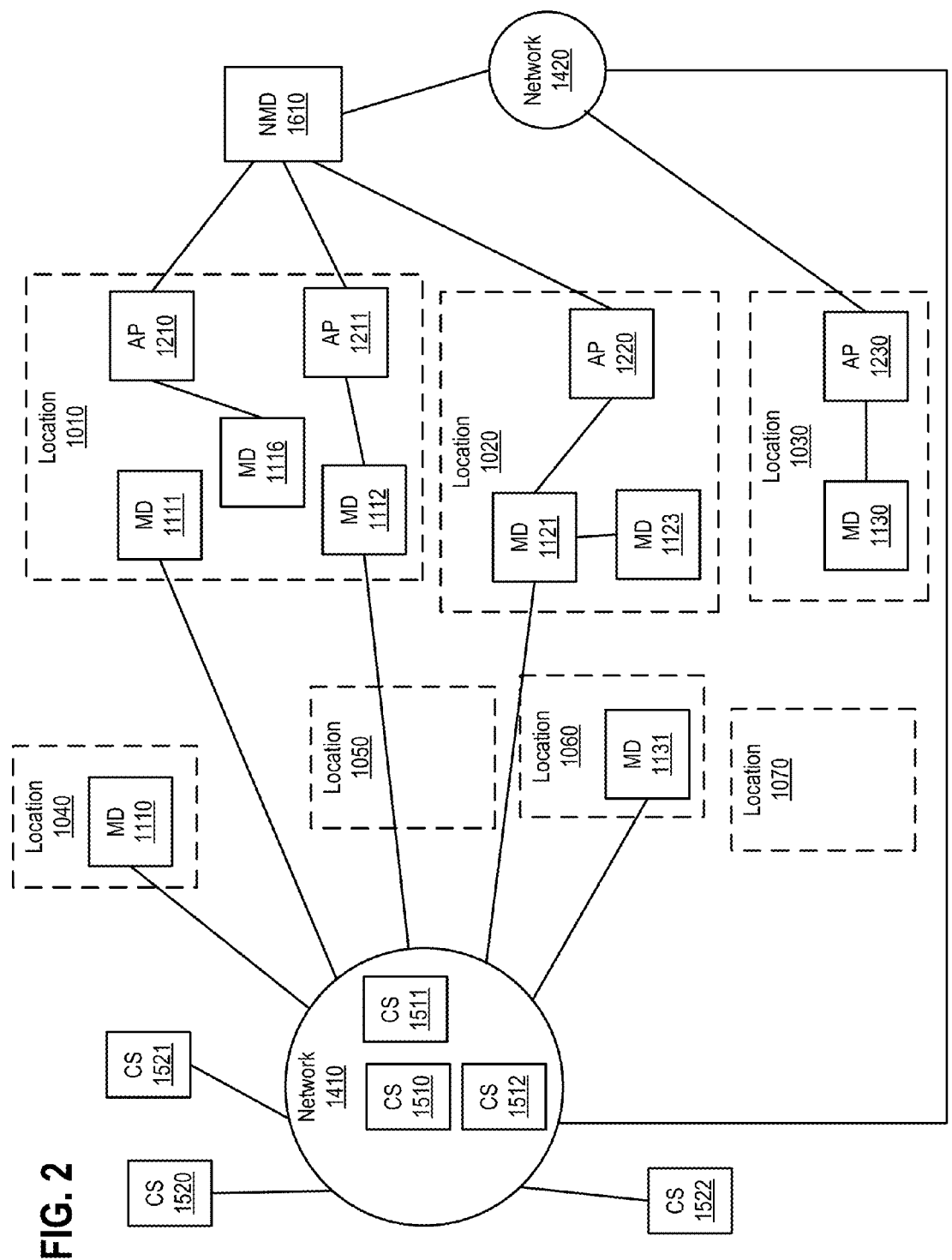
FIG. 2 provides a block diagram a block diagram of one or more network communications systems, according to one or more embodiments.

In one or more embodiments, one or more MDs can receive mapping information and/or direction information associated with one or more locations of WLANs based on respective one or more locations of the one or more MDs. For example, MD 1111 can receive mapping information and/or direction information associated with location 1010 based on location 1040. In one instance, a user of MD 1111 can transport MD 1111 to location 1010, using respective mapping information and/or direction information, where the user can use MD 1116 and AP 1210 to communicate with network 1420 as illustrated in FIG. 2. In another instance, a user of MD 1121 can transport MD 1121 to location 1020, using respective mapping information and/or direction information, where the user can use MDs 1121 and 1123 and AP 1210 to communicate with network 1420 as illustrated in FIG. 2.

In one or more embodiments, one or more computer systems included in and/or coupled to network 1410 can determine a location of one or more of MDs 1110-1131. In one example, the one or more computer systems can determine MD 1111 to be at location 1040 and can provide mapping information and/or direction information to MD 1111 via network 1410. In one instance, the mapping information can indicate one or more of geographic locations 1010-1030 (e.g., one or more addresses, one or more latitude/longitude coordinates, etc.) that can be used with a map. In a second instance, the mapping information can include a map that is displayable via a display of MD 1111 and that includes one or more of locations 1010-1040. In another instance, the direction information can include turn-by-turn directions from location 1040 to at least one of locations 1010-1030. For example, the direction information can include turn-by-turn directions from location 1040 to location 1010. In one or more embodiments, one or more of the mapping information and the direction information can be updated as the MD is transported from one location to another location. Similarly, the one or more computer systems can determine MD 1112 to be at location 1050 and can provide mapping information and/or direction information to one or more of locations 1010-1030 where use of one or more respective WLANs at the one or more of locations 1010-1030 may be possible.

In one or more embodiments, the one or more computer systems can determine that a MD is at a location (e.g., a location of locations 1010-1070) via one or more methods and/or processes. In one or more embodiments, the one or more methods and/or processes to determine that a MD is at a location can include comparing position information (e.g., latitude, longitude, altitude, etc.) of the MD with position information of a location that includes at least one wireless AP. In one example, the position information of the MD can be determined using data from a global position system (GPS) device and/or mechanism. For instance, the GPS device and/or mechanism can be included in the MD, and the MD can communicate position information from the GPS device and/or mechanism to the one or more computer systems (e.g., one or more of computer systems 1510-1522) via network 1410. In a second example, the position information of the MD can be determined using a triangulation method and/or process. For instance, at least three differently positioned cellular antennas coupled to one or more base transceiver stations can communicate with the MD, and strength of a signal and/or timing the signal propagation from the MD to the at least three antennas can be used in determining the position information of the MD.

In a third example, strength of a signal from the MD to a single cellular telephone tower can be used in determining the position information of the MD. For instance, the strength of the signal transmitted from the MD can be different from the strength of the signal received by the cellular telephone tower, and a distance from the cellular telephone tower can be determined based on a differenced in transmitted strength of the signal and received strength of the signal. For example, a computer system (e.g., a computer system of computer systems 1510-1522) can communicate a signal to the MD, where the signal includes information that indicates a first signal strength, and the MD can transmit one or more signals, at or close to the first signal strength, to network 1410. Network 1410 can receive, at a second signal strength, the one or more signals transmitted by the MD, where the second signal strength is less than the first signal strength due to path loss, terrain, etc. In one or more embodiments, determining the distance from the cellular telephone tower can be based on determining a path loss attenuation factor.

In one or more embodiments, a data structure stored in a memory medium can include terrain and/or data clutter information that can be used in determining the distance from the cellular telephone tower using a calculation based on the differenced in transmitted strength of the signal and received strength of the signal. In one or more embodiments, comparing position information of the MD with position information of a location that includes at least one wireless AP can include a set of one or more comparisons of a set of one or more locations that are in a vicinity of a cellular telephone antenna coupled to a base transceiver station, that can communicate with the MD, with the position information of the MD. In one or more embodiments, the vicinity of the antennas coupled to the base transceiver station that can communicate with the MD can include a sector of an area or volume covered by the antenna, and the set of one or more locations can include one or more locations within the sector.

Turning now to FIG. 2, a block diagram of one or more network communications systems is illustrated, according to one or more embodiments. As shown, one or more MDs can be transported to various corresponding locations. For example, MDs 1111, 1112, and 1116 can be located at location 1010; MDs 1121 and 1123 can be located at location 1020; MD 1130 can be located at location 1030; MD 1110 can be located at location 1040; and MD 1131 can be located at location 1060. As illustrated, a user of MD 1111 can transport MD 1111 (e.g., a mobile wireless telephone) and can transport MD 1116 (e.g., a laptop) to location 1010. For example, the user of MD 1111 can obtain a token via network 1410 and via MD 1111 and can input the token into MD 1116 so that MD 1116 can communicate with the WLAN and/or wireless AP 1210 that is utilized in implementing the WLAN at location 1010.

As shown, a user of MD 1121 can transport MD 1121 (e.g., a mobile wireless telephone) and can transport MD 1123 (e.g., a laptop) to location 1020. For example, the user of MD 1121 can obtain a token via network 1410 and via MD 1121 and can use the token so that MD 1121 can communicate with the WLAN and/or wireless AP 1220 that is utilized in implementing the WLAN at location 1020. In one or more embodiments, MD 1123 can be coupled to MD 1121, and MD 1123 can utilize, via MD 1121, the WLAN and/or wireless AP at location 1020. As illustrated, MDs 1110 and 1131 can be transported to respective locations 1040 and 1060.

Figure 3:
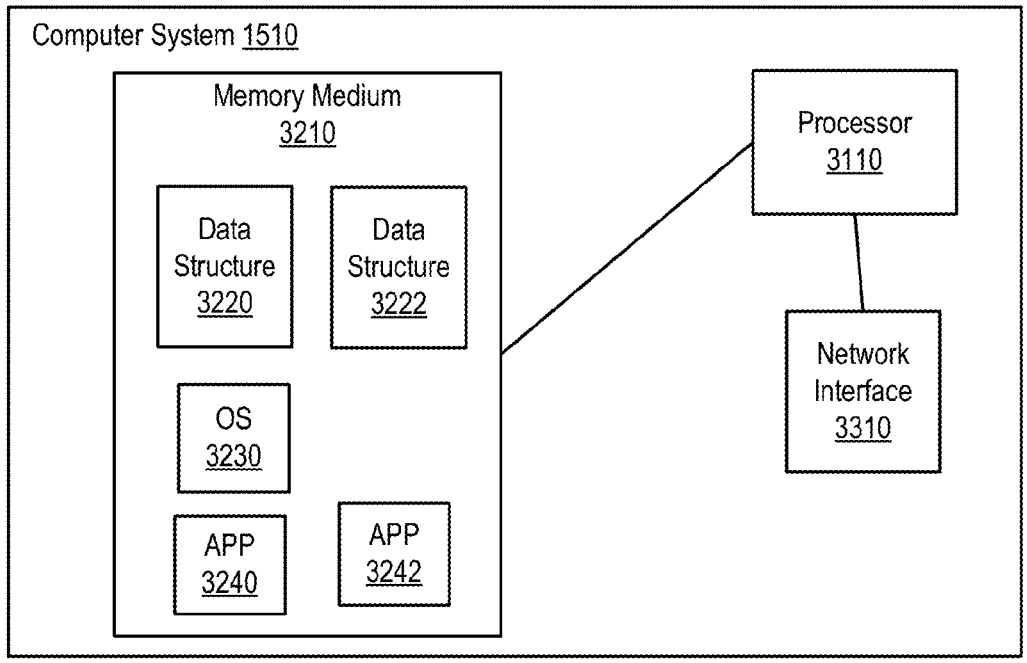
FIG. 3 provides block diagram of a computer system, according to one or more embodiments.

Turning now to FIG. 3, a block diagram of a computer system is illustrated, according to one or more embodiments. As shown, computer system (CS) 1510 can include a memory medium 3210 coupled to a processor 3110, and computer system 1510 can include a network interface 3310. In one or more embodiments, memory medium 3210 can include one or more data structures 3220 and 3222, one or more applications (APPs) 3240 and 3242, and/or an operating system (OS) 3230 that can include instructions executable by processor 3110 and/or data to implement one or more methods and/or one or more systems associated with computer system 1510. In one or more embodiments, computer system 1510 may be any of various types of devices, including a server computer system, a networking appliance, and/or a core network server such as a home location register (HLR) or a home subscriber server (HSS), among others. In one or more embodiments, processor 3110 can include one or more cores, and each core of processor 3110 can implement an instruction set architecture (ISA). In one or more embodiments, one or more of computer systems 1511, 1512, and 1520-1522 can include same or similar structures and/or functionality as described with reference to computer system 1510.

Figure 4:
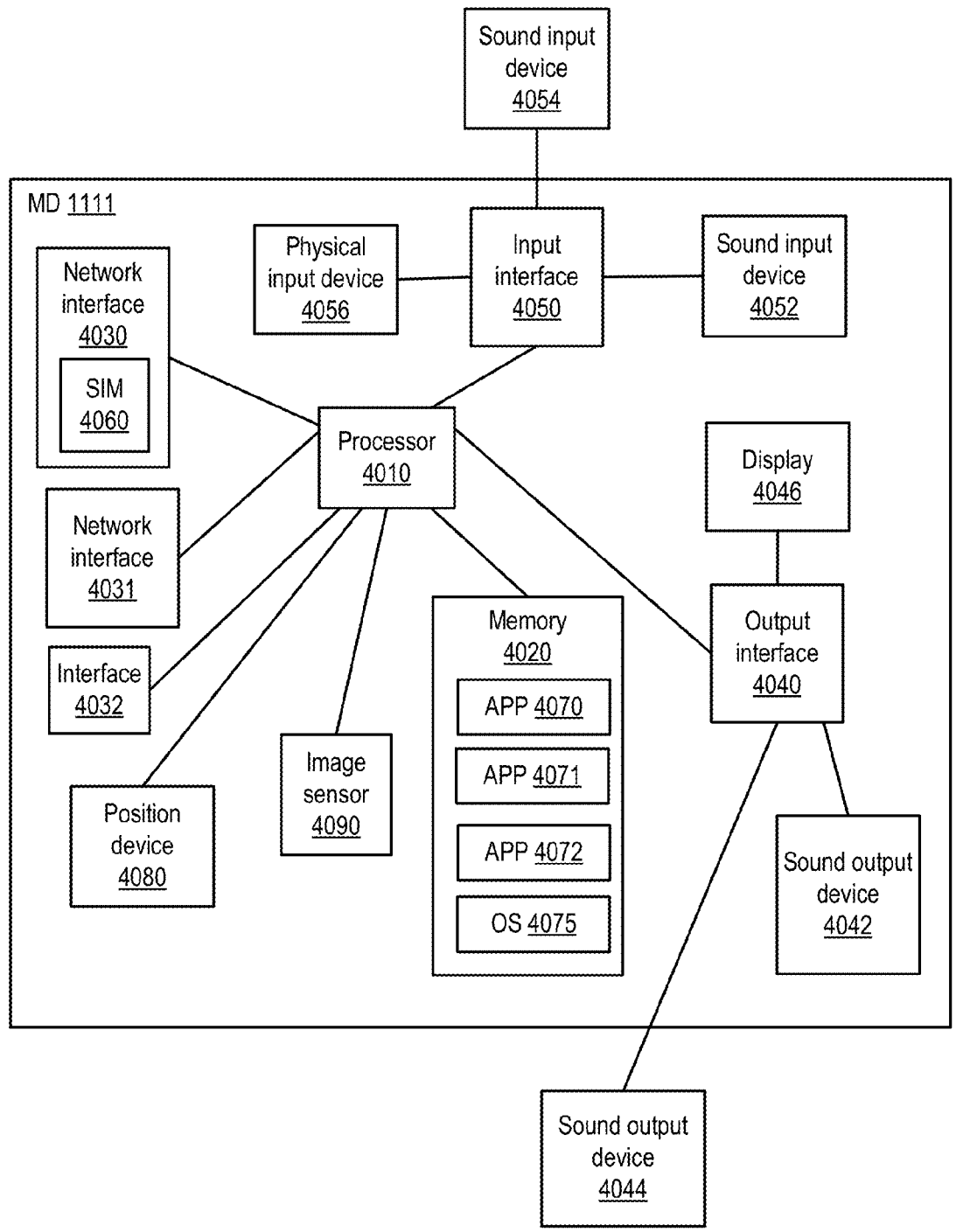
FIG. 4 provides a block diagram of a mobile device, according to one or more embodiments.

Turning now to FIG. 4, a block diagram of a mobile device is illustrated, according to one or more embodiments. As shown, MD 1111 can include a memory medium 4020 coupled to a processor 4010, and MD 1111 can include one or more network interfaces 4030 and 4031, interface 4032, a user output interface 4040, a user input interface 4050, a position device 4080, and an image sensor 4090, among others, coupled to processor 4010. In one or more embodiments, memory medium 4020 can include one or more applications (APPs) 4070-4072 and/or an OS 4075 that can include instructions executable by processor 4010 to implement one or more methods and/or one or more systems associated with MD 1111. In one or more embodiments, MD 1111 may be any of various types of devices, including a computer system, such as a portable computer, a tablet computing device, a laptop computing device, a notebook computing device, a personal digital assistant (PDA), a mobile wireless telephone (e.g., a cellular telephone, a satellite telephone, etc.), a wearable computing device, an Internet appliance, a communications device, a handheld mobile computing device, or other wired or wireless device. In one or more embodiments, processor 4010 can include one or more cores, and each core of processor 4010 can implement an instruction set architecture (ISA).

In one or more embodiments, user output interface 4040 can be used to convey information (e.g., text, graphic, video, haptic, audio, etc.) to a user of MD 1111. For example, MD 1111 may include a display 4046 (e.g., a display screen) coupled to output interface 4040 that can be used to convey text, graphic, image, motion picture, and/or video information to a user of MD 1111. In one or more embodiments, MD 1111 can include a sound output device 4042 coupled to user output interface 4040. In one or more embodiments, sound output device 4042 can include a device and/or circuitry that can produce one or more sounds.

In one or more embodiments, user output interface 4040 can be coupled to a sound output device 4044. In one instance, sound output device 4044 can include one or more of an amplifier and/or a speaker. In another instance, sound output device 4044 can include one or more earphones. In one or more embodiments, user output interface 4040 can be coupled to sound output device 4044 in a wired fashion. In one or more embodiments, user output interface 4040 can be coupled to sound output device 4044 in a wireless fashion. In one example, user output interface 4040 can communicate sound information to output device 4044 using an ISM band. For instance, user output interface 4040 can communicate sound information to sound output device 4044 using one or more of a PAN, IEEE 802.15, IEEE 802.15.4, a ZigBee® standard (ZigBee® is a registered trademark of the Zigbee Alliance), 6LoWPAN, frequency modulation of a carrier wave, amplitude modulation of a carrier wave, light signals, and serial pulses, among others. In one or more embodiments, sound output device 4044 can be or be included in a device that includes an IEEE 802.15 receiver or transceiver, such as a Bluetooth® specification-compliant headset or earpiece (Bluetooth® is a registered trademark of Bluetooth SIG, Inc.).

In one or more embodiments, user input interface 4050 can be used to receive sounds from a user of MD 1111. In one example, MD 1111 can include a sound input device 4052 coupled to user input interface 4050. In one instance, sound input device 4052 can include a microphone. In another example, a sound input device 4054 coupled to user input interface 4050. In one or more embodiments, a sound input device can include a device and/or circuitry that can receive one or more sounds and transform the one or more sounds into one or more electrical signals (e.g., voltage and/or current). In one or more embodiments, a sound input device can include an acoustic to electric transducer or sensor that can convert one or more sounds into one or more electrical signals. For example, the acoustic to electric transducer or sensor can include a body (e.g., a diaphragm, a crystal, a ceramic, etc.) that can vibrate in response to one or more sounds (e.g., in response to sound pressure), and movement of the body can be transformed and/or converted into one or more electrical signals. For instance, a sound input device can include a microphone. In one or more embodiments, a microphone can use one or more of capacitance change (e.g., a condenser microphone), electromagnetic induction (e.g., a dynamic microphone), piezoelectric generation, and light modulation to produce one or more electrical signal from one or more mechanical vibrations.

In one or more embodiments, user input interface 4050 can be coupled to sound input device 4054 in a wired fashion. In one or more embodiments, user input interface 4050 can be coupled to sound input device 4054 in a wireless fashion. In one example, user input interface 4050 can communicate sound information to sound input device 4054 using an ISM band. For instance, sound input device 4054 can communicate sound information to user input interface 4050 using one or more of a PAN, IEEE 802.15, IEEE 802.15.4, a ZigBee® standard (ZigBee® is a registered trademark of the Zigbee Alliance), 6LoWPAN, frequency modulation of a carrier wave, amplitude modulation of a carrier wave, light signals, and serial pulses, among others. In one or more embodiments, sound input device 4054 can be or be included in a device that includes an IEEE 802.15 transmitter or transceiver, such as a Bluetooth® specification-compliant headset or microphone (Bluetooth® is a registered trademark of Bluetooth SIG, Inc.).

In one or more embodiments, user input interface can be used to receive user input from a user of MD 1111. In one example, MD 1111 can include a physical input device 4056 (e.g., a keyboard) coupled to input interface 4050 that can be used to receive user input from a user of MD 1111. In another example, MD 1111 may include one or more sensors that can be used to receive user input from a user of MD 1111. In one instance, one or more sensors can include resistive sensors that can be used to determine one or more positions on a display screen. In another instance, one or more sensors can include capacitive sensors that can be used to determine one or more positions on a display screen. In one or more embodiments, user output interface 4040 and user input interface 4050 can be used to implement a keyboard. For example, user output interface 4040 can be used to present an image of a keyboard, and user input interface 4050 can receive a position of user input on the image of the keyboard to determine a received key of the keyboard.

In one or more embodiments, network interface 4030 can include a transceiver that is operable to communicate information with network 1410. In one or more embodiments, network interface 4030 can be used to couple MD 1111 to network 1410, and MD 1111 can use network interface 4030 to communicate information (e.g., data, voice data, etc.) with network 1410. In one or more embodiments, network interface 4030 can include a subscriber identity module (SIM) 4060. In one or more embodiments, SIM 4060 can securely store an international mobile subscriber identity (IMSI) which can include a unique number and/or identity associated with a global system for mobile communications (GSM) network and/or a universal mobile telecommunications system (UMTS) network, which can be or be included in network 1410. In one example, the unique number and/or identity can be used to determine information corresponding to MD 1111 from a HLR, a HSS, and/or from a visitor location register (VLR). In one or more embodiments, a MSISDN (mobile subscriber ISDN (integrated services digital network) number, mobile station international ISDN number(s), or mobile international ISDN number) can be a number that can uniquely identify a subscription in a GSM mobile network and/or a UMTS mobile network, which can be or be included in network 1410. For example, the MSISDN can include a telephone number corresponding to SIM 4060. In one instance, the MSISDN can include a country code, a national destination code, and a subscriber number. In another instance, the MSISDN can include a country code, a number planning area, and a subscriber number.

In one or more embodiments, SIM 4060 can be embodied in a removable card (e.g., a SIM card) that can be removed from a first MD associated with a first subscriber account and placed in a second MD, so that the second MD can be associated with the first subscriber account. For example, SIM 4060 embodied as a SIM card can be associated with a first subscriber account and used in MD 1111, thereby associating MD 1111 with the first subscriber account; SIM 4060 can be removed from MD 1111, thereby disassociating MD 1111 with the first subscriber account; and SIM 4060 can be placed in MD 1121, thereby associating MD 1121 with the first subscriber account.

In one or more embodiments, network interface 4031 can be used to communicate with one or more wireless APs. In one example, network interface 4031 can be configured and used to communicate with wireless AP 1210 in a wireless fashion. In one or more embodiments, network interface 4031 can include a transceiver that is operable to communicate information with one or more wireless APs.

In one or more embodiments, interface 4032 can be used to communicate with one or more other MDs. In one example, interface 4032 can be used to communicate with one or more other MDs in a wired fashion. For instance, interface 4032 can communicate with another MD using USB, Ethernet, a FireWire® (i.e. IEEE 1394) interface (FireWire® is a trademark of Apple Computer, Inc., registered in the U.S. and other countries), RS-232, serial peripheral interconnect, or inter-integrated circuit, among others. In another example, interface 4032 can be used to communicate with one or more other MDs in a wireless fashion. For instance, interface 4032 can communicate with another MD using a Bluetooth® specification (Bluetooth® is a registered trademark of Bluetooth SIG, Inc.), IEEE 802.11, IEEE 802.15, IEEE 802.15.4, 6LoWPAN, a ZigBee® standard (ZigBee® is a registered trademark of the Zigbee Alliance), or infrared signaling, among others.

In one or more embodiments, MD 1111 can include a position device 4080 coupled to processor 4010. In one example, position device 4080 can include a GPS receiver. In another example, position device 4080 can include a terrestrial radio navigation system receiver such as LORAN (LOng RAnge Navigation). In one or more embodiments, position device 4080 can provide one or more services such as one or more of positioning, navigation, and timing to processor 4010. For example, a positioning service can provide one or more of latitude information, longitude information, altitude information, and accuracy information (e.g., a radius of uncertainty for a geographic location or position).

In one or more embodiments, position device 4080 can provide heading information. For example, position device 4080 can include a compass and/or implement a compass to provide heading information. In one or more embodiments, position device 4080 can provide device position information such as tilt and/or angle information. For example, position device 4080 can include one or more of an accelerometer and an electronic gyroscope. In one or more embodiments, the compass can be electronically gimbaled using one or more of an accelerometer and an electronic gyroscope.

In one or more embodiments, electronic image sensor 4090 can provide digital data of one or more of an image, a motion picture, and a video. For example, electronic image sensor 4090 can be or include a digital camera. In one or more embodiments, the digital data of one or more of an image, a motion picture, and a video can include one or more formats. For example the one or more formats can include one or more of a tagged image file format (TIFF), a joint photographic experts group (JPEG) format, an exchangeable image file format (EXIF), a RAW format, a portable network graphics (PNG) format, a graphic interchange format (GIF), a bitmap (BMP) format, and a vector file format, among others. In one or more embodiments, one or more of MDs 1110 and 1112-1131 of FIG. 1 and FIG. 2 can include same and/or similar structures and/or functionalities as described with reference to MD 1111.

Figure 5:
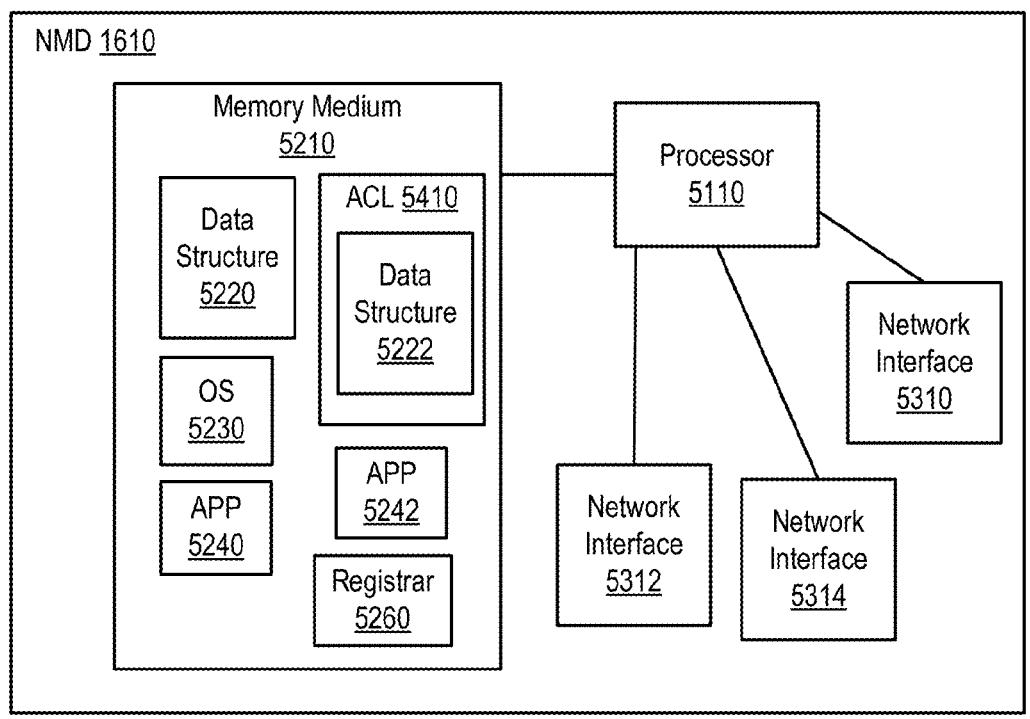
FIG. 5 provides a block diagram of a network management device, according to one or more embodiments.

Turning now to FIG. 5, a block diagram of a network management device is illustrated, according to one or more embodiments. As shown, NMD 1610 can include a memory medium 5210 coupled to a processor 5110, and NMD 1610 can include one or more network interfaces 5310-5314 coupled to processor 5110. In one or more embodiments, one or more of network interfaces 5310-5314 can be coupled to one or more of network 1420 and APs 1210-1220. In one example, network interface 5310 can implement an Ethernet interface that is operable to be coupled to a gateway device, where the gateway device is operable to be coupled to network 1420 or one or more of APs 1210-1220. In a second example, network interface 5312 can implement a WiMax (e.g., IEEE 802.16) network interface that is operable to be coupled to a WiMax access point that is operable to be coupled to network 1420. In another example, network interface 5314 can implement a T-1 network interface that is operable to be coupled to network 1420 or one or more of APs 1210-1220.

As shown, memory medium 5210 can include an ACL 5410, one or more data structures 5220 and 5222, one or more APPs 5240 and 5242, a registrar 5260, and/or an OS 5230 that can store data and/or instructions executable by processor 5110 to implement one or more systems, processes, and/or methods described herein.

In one or more embodiments, NMD 1610 can control and/or configure one or more of APs 1210-1220. For example, NMD 1610 can use registrar 5260 to control and/or configure one or more of APs 1210-1220. For instance, registrar 5260 can process an enrollee (e.g., a MD, a wireless AP, etc.), can implement at least a portion of a registration protocol (RP) (e.g., a WPS RP), can receive tokens from one or more network providers, and configure a wireless AP with configuration information (e.g., media access control (MAC) address, encryption key, etc.) associated with an enrollee. In one or more embodiments, the RP can utilize an extensible authentication protocol (EAP). For example, the RP can be utilized in exchanging multiple EAP messages between a registrar (e.g., NMD 1610 executing registrar 5260, wireless AP 1210 executing registrar 8280, etc.) and an enrollee (e.g., one of MDs 1110, 1112, 1115, 1116, 1120, and APs 1210-1220).

Figure 6:
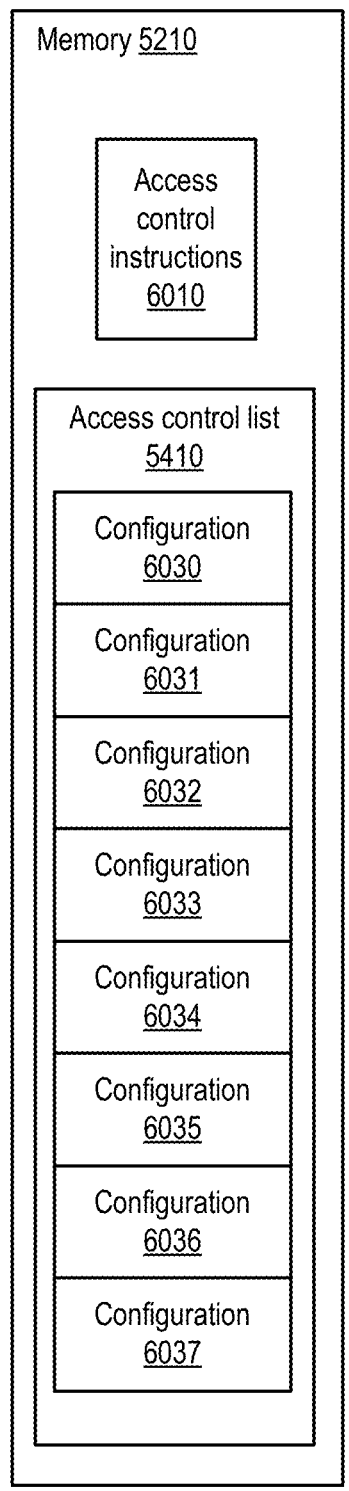
FIG. 6 provides a block diagram of a memory of a network management device, according to one or more embodiments.

Turning now to FIG. 6, a block diagram of a memory of a network management device is illustrated, according to one or more embodiments. As shown, memory 5210 can include access control instructions 6010 that can be executed on processor 5110. For example, access control instructions 6010 that can be executed on processor 5110 to control access to and/or services of network 1420 for computing devices coupled to one or more of wireless APs 1210-1220. In one or more embodiments, ACL 5410 can be used by NMD 1610 to control access to and/or services of network 1420 for computing devices coupled to one or more of wireless APs 1210-1220.

In one or more embodiments, ACL 5410 can be used by access control instructions 6010 executed on processor 5110 to control outbound network access (e.g., access from one or more MDs coupled to one or more of wireless APs 1210-1220 to network 1420) and/or inbound network access (e.g., access from network 1420 to one or more MDs coupled to wireless APs 1210-1220) using source and/or destination network addresses. For example, ACL 5410 can be used to control outbound network access and/or inbound network access on a packet level (e.g., on a per packet basis). In one or more instances, ACL 5410 can be used to control outbound network access and/or inbound network access on one or more of an IP packet level, a TCP packet level, and/or a UDP packet level.

As shown, ACL 5410 can include one or more configurations 6030-6037. For example, configuration 6030 can be associated with one or more network addresses (e.g., IP addresses, MAC addresses, etc.), and configuration 6030 can include data that can be used to control access of MD 1115 to network 1420. In one or more embodiments, configuration 6030 can include one or more data structures that can be used to store and/or retrieve the data that can be used to control access of MD 1115 to network 1420.

Turning now to FIG. 7, a block diagram of an access control list configuration is illustrated, according to one or more embodiments. As illustrated, configuration 6030 can include source address information 7010-7015 that corresponds to respective destination information 7020-7025 that corresponds to respective service information 7030-7035 that corresponds to respective direction information 7040-7045 that corresponds to respective permission information 7050-7055. In one or more embodiments, source address information 7010-7015 and destination information 7020-7025 can be used to control outbound network access (e.g., access from one or more MDs coupled to one or more wireless APs 1210-1220 to network 1420) and/or inbound network access (e.g., access from network 1420 to one or more MDs coupled to one or more wireless APs 1210-1220).

In one example, source address information 7010 can store address information associated with MD 1115, and direction information 7040 can indicate an outbound traffic direction (e.g., outbound from one or more MDs coupled to one or more wireless APs 1210-1220 to network 1420). In one instance, source address information 7010 can store IP address information associated with MD 1115. In another instance, source address information 7010 can store MAC address information associated with MD 1115. In another example, destination address information 7020 can store address information associated with one or more network addresses of network 1420. In one instance, destination address information 7020 can store IP address information. For example, address information 7020 can include a range of addresses, such as a subnet (e.g., 216.12.254.128/25) and/or addresses 216.9.25.3 through 216.10.25.5, a single network address, such as 216.12.254.7, and/or a set of addresses, such as {216.12.254.4, 209.191.93.52, 216.12.252.42, 96.17.249.145}, among others. In one or more embodiments, MD 1115 can access network addresses of network 1420 that are associated with destination address information 7020. In one or more embodiments, destination address information 7020 can store information that indicates that MD 1115 is not restricted to any particular network address of network 1420. For example, destination address information may store 0.0.0.0 to indicate that MD 1115 is not restricted to any particular network address of network 1420.

In one or more embodiments, service information 7030 can be used to control one or more services associated with source address information 7010 and/or destination address information 7020. In one or more examples, service information 7030 can indicate one or more services of email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger® service (AOL Instant Messenger® is a registered trademark of AOL LLC Limited Liability Company), gaming, licensing, license management, digital rights management, network time, remote desktop, remote windowing, audio, database (e.g., an Oracle® database (Oracle® is a registered trademark of the Oracle Corporation), a Microsoft® SQL Server® database (Microsoft® and SQL Server® are either registered trademarks or trademarks of Microsoft Corporation in the United States and/or other countries), a PostgreSQL database, etc.), authentication, accounting, authorization, virtual local area network (VLAN) (e.g., IEEE 802.1q), virtual private network or VPN, audio, phone, Voice Over Internet Protocol (VoIP), paging, and video, among others. In one or more embodiments, these one or more services can be associated with and/or correspond to one or more protocols of one or more computer and/or software applications.

In one or more embodiments, a service can be associated with a port (e.g., a port number). For example, a world wide web service using a HTTP can use port 80. For instance, the HTTP can be used with a TCP that can use port 80. In one or more embodiments, "well known ports" can be those from 0 through 1023, "registered ports" can be those from 1024 through 49151, and/or "dynamic and/or private ports" can be those from 49151 through 65535. More information regarding port numbers can be found in Request for Comment (RFC) 1700 maintained by and available from a working group of the Internet Engineering Task Force (IETF), a standards organization for the Internet.

In one or more embodiments, service information 7030 can indicate that any service can be used with source address information 7010 and/or destination address information 7020. In one or more embodiments, service information 7030 can indicate that specific one or more services can be used with source address information 7010 and/or destination address information 7020. In one example, service information 7030 can indicate that a domain name service can be used with source address information 7010 and/or destination address information 7020. In another example, service information 7030 can indicate that a world wide web service can be used with source address information 7010 and/or destination address information 7020.

In one or more embodiments, destination address information 7021 can store address information associated with MD 1115, and direction information 7041 can indicate an inbound traffic direction (e.g., inbound from network 1420 to one or more MDs coupled to one or more wireless APs 1210-1220 to network 1420). In one instance, destination address information 7021 can store IP address information associated with MD 1115. In another instance, destination address information 7021 can store MAC address information associated with MD 1115. In one example, source address information 7011 can store address information associated one or more network addresses of network 1420. In one instance, source address information 7011 can store IP address information. For example, address information 7011 can include a range of addresses, such as a subnet (e.g., 216.12.254.128/25) and/or addresses 216.9.25.3 through 216.10.25.5, a single network address, such as 216.12.254.7, and/or a set of addresses, such as {216.12.254.4, 209.191.93.52, 216.12.252.42, 96.17.249.145}, among others. In one or more embodiments, one or more computer systems with associated with source address information 7011 can communicate with MD 1115. In one or more embodiments, source address information 7011 can store information that indicates that one or more computer systems associated with addresses of network 1420 are not restricted to any particular network address of network 1420. For example, source address information 7011 may store 0.0.0.0 to indicate that one or more computer systems associated with addresses of network 1420 are not restricted to any particular network address of network 1420.

In one example, service information 7031 can indicate a VoIP service. For instance, source address information 7011, destination address information 7021, service information 7031, and direction information 7041 can be used to control access of the VoIP service to MD 1115. For example, source address information 7011, destination address information 7021, service information 7031, and direction information 7041 can be used to control incoming VoIP calls to MD 1115.

In one or more embodiments, NMD 1610 can use permission information 7050 to control whether or not network communications (e.g., network packets) associated with source address information 7010, destination address information 7020, service information 7030, and direction information 7040 is permitted. Further, NMD 1610 can use permission information 7051 to control whether or not network communications (e.g., network packets) associated with source address information 7011, destination address information 7021, service information 7031, and direction information 7041 are permitted. In the fashion described above, NMD 1610 can control access to/from and/or services of network 1420 for one or more MDs coupled to one or more wireless APs 1210-1220 to network 1420 by controlling control access to/from and/or services corresponding to one or more network addresses of network 1420, according to one or more embodiments. In one or more embodiments, NMD 1610 and/or another computer system coupled to network 1420 can modify configuration 6030 to control access to/from and/or services of network 1420 for one or more MDs coupled to one or more wireless APs 1210-1220 to network 1420 by using NMD 1610 and ACL 5410 to control access to/from and/or services corresponding to one or more network addresses of network 1420. In one or more embodiments, one or more portions of ACL 5410 can be stored in a first data structure (e.g., data structure 5220). In one or more embodiments, one or more portions of ACL 5410 can be used to populate a second data structure (e.g., data structure 5222). For example, the second data structure can be populated with information from ACL 5410 in a fashion usable by access control instructions 6010 when executed by processor 5110. In one or more embodiments, the second data structure can be considered an access control list.

In one example, NMD 1610 can permit MD 1115 access to some services and/or network addresses of network 1420 using ACL 5410 and can modify ACL 5410 to permit MD 1115 access to additional services and/or network addresses of network 1420. For instance, NMD 1610 can permit MD 1115 to access a "walled garden" that can include access to one or more domain name services (e.g., provided by one or more domain name servers) and/or one or more web servers (e.g., one or more web servers that can perform network access services, one or more web servers that can provide information regarding location 1010, etc.). In one or more embodiments, a configuration of ACL 5410 can include the walled garden.

In a second example, MD 1115 can be permitted access to some services and/or network addresses of network 1420, and NMD 1610 can reduce or eliminate access to one or more services and/or network addresses of network 1420 using ACL 5410 by modifying ACL 5410 to reduce or eliminate access to one or more services and/or network addresses of network 1420 previously permitted to MD 1115. In one or more embodiments, NMD 1610 can receive one or more signals from a remote computing device and can, in response, permitted additional access or reduce or eliminate access to some services and/or network addresses of network 1420. For example, NMD 1610 can receive the one or more signals via network 1420.

Figure 8:
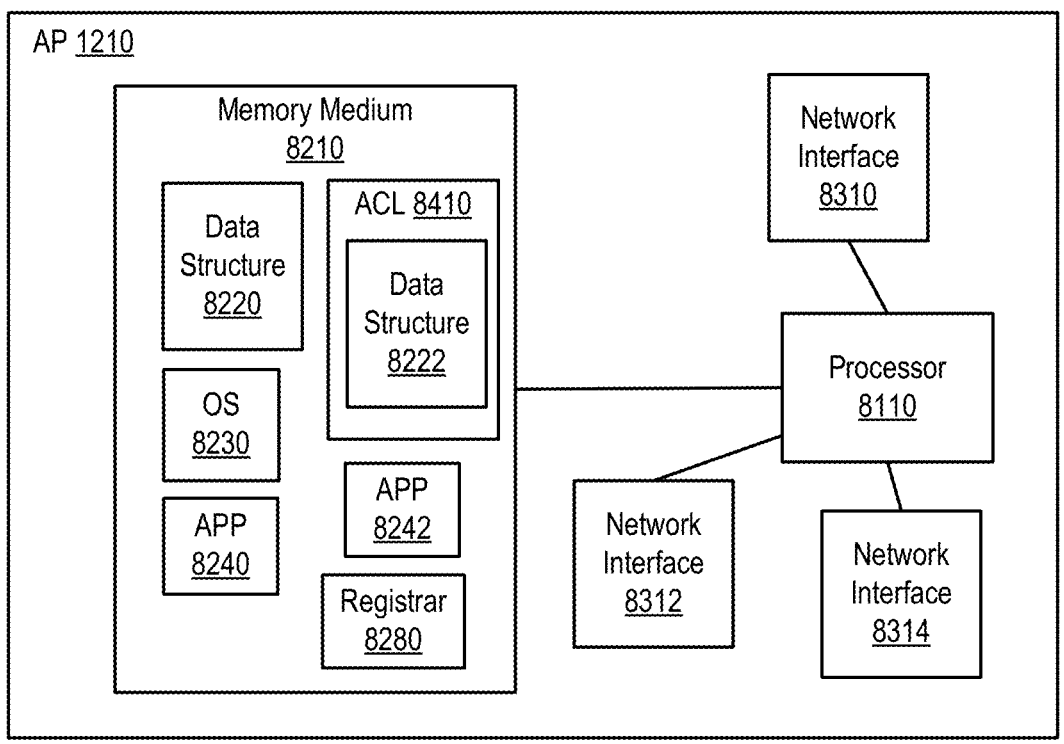
FIG. 8 provides a block diagram of a wireless access point, according to one or more embodiments.

Turning now to FIG. 8, a block diagram of a wireless access point is illustrated, according to one or more embodiments. As shown, wireless AP 1210 can include a memory medium 8210 coupled to a processor 8110, and wireless AP 1210 can include one or more network interfaces 8310-8314 coupled to processor 8110.

In one or more embodiments, a network interface (e.g., a network interface from network interfaces 8310-8314) can be coupled to network 1420 or NMD 1610. In one example, network interface 8310 can implement an Ethernet interface that is operable to be coupled to a gateway device, where the gateway device is operable to be coupled to network 1420. In another example, network interface 8310 can implement a WiMax (e.g., IEEE 802.16) network interface that is operable to be coupled to a WiMax access point that is operable to be coupled to network 1420. In one or more embodiments, a network interface (e.g., a network interface from network interfaces 8310-8314) can be coupled to one or more MDs in a wireless fashion. In one example, network interface 8312 can implement a Wi-Fi (e.g., IEEE 802.11) network interface that can wirelessly communicate with one or more MDs. In another example, network interface 8314 can implement a wireless USB interface that can wireless communicate with one or more MDs.

As shown, memory medium 8210 can include an ACL 8410, one or more data structures 8220 and 8222, one or more APPs 8240 and 8242, a registrar 8280, and/or an OS 8230 that can store data and/or instructions executable by processor 8110 to implement one or more systems, processes, and/or methods described herein. In one or more embodiments, wireless AP 1210 can include same and/or similar structures and/or functionalities as described with reference to NMD 1610. In one example, AP 1210 can include and control an ACL in a similar fashion as described with reference to NMD 1610. In another example, AP 1210 can include and control a registrar in a similar fashion as described with reference to NMD 1610. In one or more embodiments, one or more of APs 1211, 1220, and 1230 can include same and/or similar structures and/or functionalities as described with reference to AP 1210.

Figure 9:
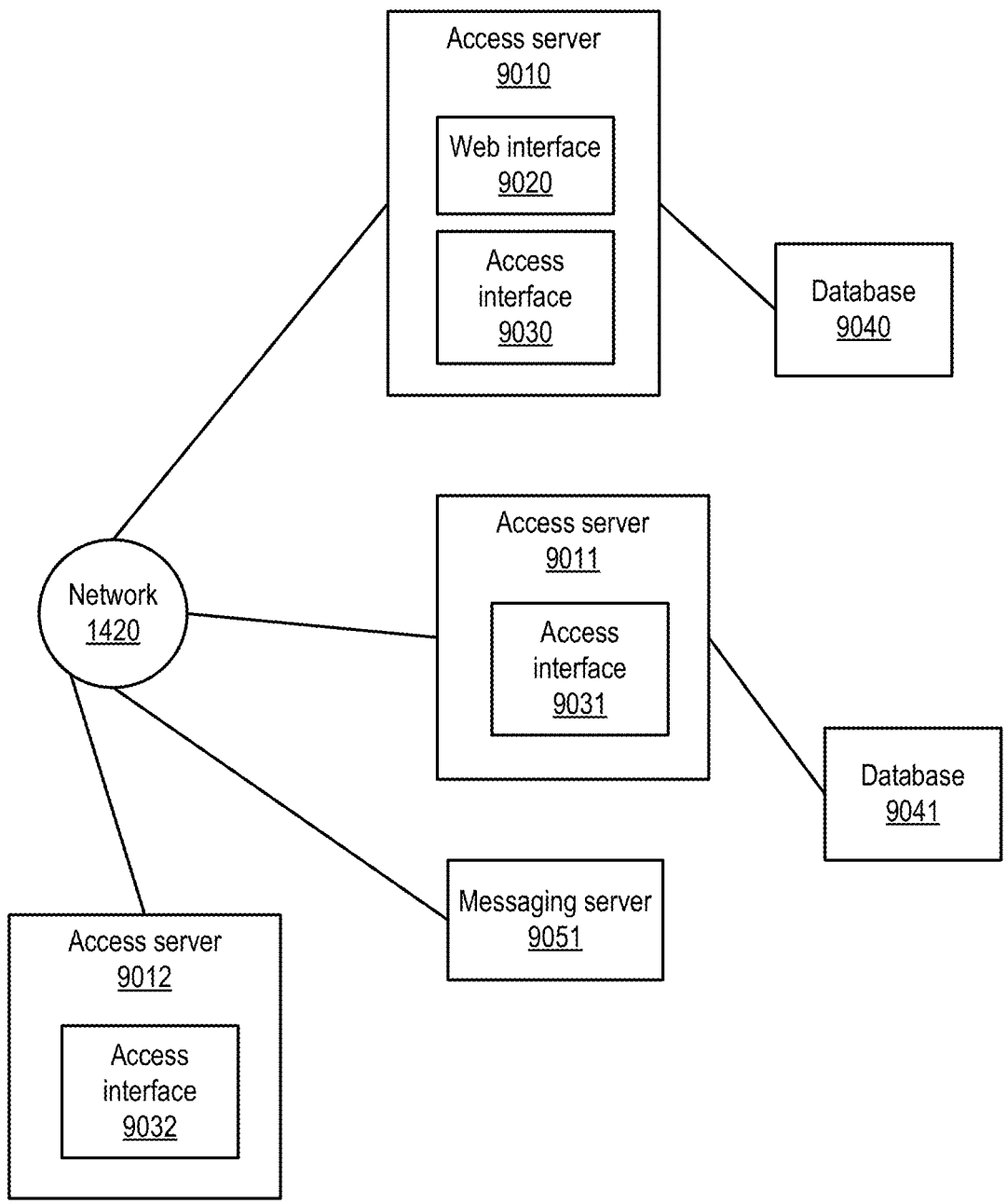
FIG. 9 provides a block diagram of access servers coupled to a network, according to one or more embodiments.

Turning now to FIG. 9, a block diagram of access servers coupled to a network is illustrated, according to one or more embodiments. As shown, access servers 9010-9012 can be coupled to network 1420. In one or more embodiments, access server 9010 can be operated by a first network provider, access server 9011 can be operated by a second network provider, and/or access server 9012 can be operated by a third network provider. In one or more embodiments, one or more of access servers 9010-9012 can provide and/or implement one or more of authentication, authorization, and accounting (AAA) services. In one or more embodiments, an authentication service can include a process and/or method of verifying an identity (e.g., an identity of a device, an identity of a user of a device, etc.). For example, one or more of a username, a password, and a telephone identification (e.g., an IMSI, a MSISDN, a portion of a MSISDN, etc.), among others, can be used to verify and/or authenticate an identity of a device, an identity of a user of a device, etc. In one or more embodiments, an authorization service can include a process and/or method of determining what an authenticated device and/or an authenticated user of a device can use, access, do, and/or perform. In one or more embodiments, an accounting service can include accounting, measuring, and/or documenting one or more resources used by a device and/or user of a device during access to services available to a device and/or user of a device through an authorization service.

In one or more embodiments, one or more of access servers 9010-9012 can include one or more interfaces. For example, the one or more interfaces can include one or more a RADIUS (remote access dial-in user service) interface, a DIAMETER (an extension and improvement of RADIUS) interface, an UPnP interface, and a web interface, among others. Other services for providing one or more of authentication, authorization, and accounting services may include EAP, TACACS (Terminal Access Controller Access Control System), TACACS+, XTACAS, IEEE 802.1x, WPS, UPnP, WPA, and/or IEEE 802.11i, among others, and one or more interfaces can be used for these services. In one or more embodiments, these can also be used for applications, such as access to network service or IP mobility, and are intended to work in both local AAA and roaming situations.

In one or more embodiments, a first interface and a second interface of the one or more interfaces can interact with each other. For example, access server 9010 can include a web interface 9020 (e.g., a web server) and an access interface 9030 (e.g., a RADIUS server). The web interface can accept identification information from a web browser (e.g., a web browser executed on MD 1115) and provide the identification information to access interface 9030, where access interface 9030 can perform an authentication service. In one or more embodiments, a computing device (e.g., MD 1115) and web interface 9020 can communicate using a HTTP and/or a secure HTTP (HTTPS).

In one or more embodiments, access interface 9030 can use a database 9040 in performing the authentication service. In one example, database 9040 can store multiple username and password pairs. In another example, database 9040 can include one of a HLR and a VLR. In one or more embodiments, access interface 9030 can proxy a received access request. For example, the access request can include an authentication request and/or an authorization request. For one instance, access interface 9030 can include a first RADIUS server, and the first RADIUS server can proxy one or more of a received authentication request and a received authorization request to access interface 9031 (e.g., a second RADIUS server). For a second instance, access interface 9032 can proxy a received access request. For example, the access request can include an authentication request and/or an authorization request. For one instance, access interface 9032 can include a third RADIUS server, and the third RADIUS server can proxy one or more of a received authentication request and a received authorization request to access interface 9031 (e.g., a second RADIUS server).

In one or more embodiments, access interface 9031 can use a database 9041 in performing one or more of an authentication service and an authorization service. In one example, database 9041 can store multiple username and password pairs. In another example, database 9041 can include one of a HLR and a VLR. As illustrated, access servers 9010 and 9011 can be coupled to respective databases 9040 and 9041. In one or more embodiments, access servers 9010 and 9011 can include respective databases 9040 and 9041.

As illustrated, a messaging server 9051 can be coupled to network 1420. In one or more embodiments, messaging server 9051 can receive a request to send a message to a MD (e.g., MD 1111) and, in response to the request, send the message to the MD. In one example, messaging server 9051 can send a text message to the MD. For instance, messaging server 9051 can send the text message to the computing device via a simple message service (SMS) and/or a multimedia message service (MMS). In one or more embodiments, messaging server 9051 can receive one or more requests to send one or more message via a short message peer-to-peer (SMPP) protocol. For example, the SMPP protocol can permit and/or enable third-parties to submit and/or transmit one or more SMS messages (e.g., one or more text messages via SMS) to one or more subscriber devices (e.g., one or more of MDs 1110-1131) of a network provider. For instance, access server 9010 (e.g., operated by the first network provider) can send a text message to MD 1111 using messaging server 9051 which can be operated by the second network provider. For example, MD 1111 can be a mobile subscriber device of the second network provider, and the first network provider can send one or more text messages to MD 1111 using messaging server 9051.

In one or more embodiments, various computing devices described herein can communicate using one or more secure communications. For example, a first computing device can communicate with a second computing device using one or more of transport layer security (TLS), HTTPS, a virtual private network (VPN), IPsec, and/or a secure socket layer (SSL), among others.

Figure 10:
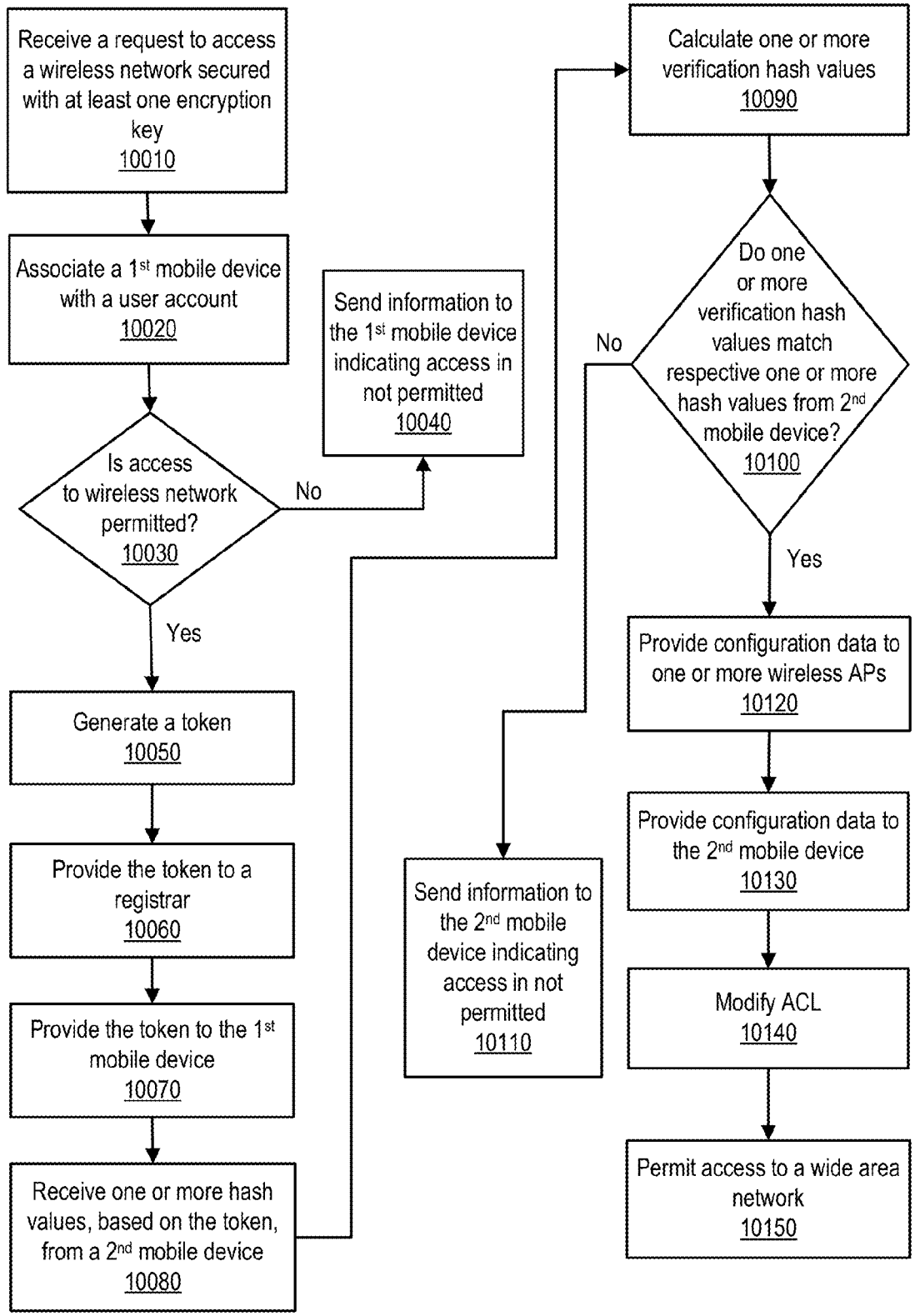
FIG. 10 illustrates a method of providing access to a wireless network, according to one or more embodiments.

Turning now to FIG. 10, a method of providing access to a wireless network is illustrated, according to one or more embodiments. At 10010, a request to access a wireless network secured with at least one encryption key can be received. In one example, a first network provider can receive the request from a user using a first MD to access a wireless network (e.g., a WLAN implemented by one or more of APs 1210 and 1211) secured with at least one encryption key. In another example, a second network provider can receive the request from a user using a first MD to access a wireless network (e.g., a WLAN implemented by one or more of APs 1210 and 1211) secured with at least one encryption key. For instance, the WLAN implemented by one or more of APs 1210 and 1211 can be operated by the first network provider, and the second network provider can have a relationship with the first network provider such that user accounts associated with the second network provider can roam onto one or more networks operated and/or controlled by the first network provider.

In one or more embodiments, the request to access the wireless network can be received via one or more of a computer system (e.g., one of computer systems 1510-1522 and access servers 9010-9012) and an operator. In one example, CS 1510 can receive the request from MD 1113. In one instance, CS 1510 can receive the request from MD 1113 via an IP via network 1410. In another instance, CS 1510 can receive the request from MD 1113 via a SMS message. In another example, an operator (e.g., an operator of the first network provider or of the second network provider) can receive the request from a user of MD 1113 via MD 1113. For instance, the user of MD 1113 can use MD 1113 as a mobile wireless telephone and make a voice request for access to the wireless network.

At 10020, a first MD (e.g., MD 1113) can be associated with a user account via a mobile telephone wireless network (e.g., network 1410). In one or more embodiments, associating the first MD with the user account can include receiving authentication information from the first MD and determining that the first MD is associated with the user account via the authentication information. In one example, the authentication information can include one or more of a username and a password. In a second example, the authentication information can include one or more of a telephone number of the first MD, an IMSI of the first MD, and a MSISDN number of the first MD, among others. In another example, the authentication information can include biometric information such as a portion of a voice sample from the user of the first MD. For instance, the portion of the voice sample can include a password (e.g., a password that is usable to access the user account).

At 10030, it can be determined whether or not access to the wireless network secured with the at least one network encryption key is permitted. In one or more embodiments, an authorization service of access server 9010 can determine whether or not a second computing device (e.g., MD 1115) associated with a user account is authorized for access to the wireless network secured with the at least one network encryption key. For example, the user account can be associated with a profile, and the authorization service of access server 9010 can access the profile associated with the user account to determine whether or not to permit access the wireless network secured with the at least one network encryption key.

In one instance, a determination of whether or not to permit access the wireless network secured with the at least one network encryption key can include determining whether or not the user account is in good standing (e.g., no overdue payments are due to a network provider, no over usage, etc.). In another instance, a determination of whether or not to permit access the wireless network secured with the at least one network encryption key can include determining whether or not the user account includes a feature, such as using a token to gain access the wireless network secured with the at least one network encryption key.

If access to the wireless network secured with the at least one network encryption key is not permitted, the method can proceed to 10040, where information can be sent to the first MD indicating that access to a WLAN (e.g., the wireless network secured with the at least one network encryption key) is not permitted. If access to the wireless network secured with the at least one network encryption key is permitted, the method can proceed to 10050.

At 10050, a token can be generated. For example, the token can include a string of characters that can be generated via one of computer systems 1510-1522 and access servers 9010-9012. In one instance, the token can be or include a password such as a WPS device password. At 10060, the token can be provided to a registrar. In one example, one of computer systems 1510-1522 and access servers 9010-9012 can provide the token to NMD 1610 via network 1420. For instance, NMD 1610 can be the registrar for WLANs at one or more locations such as locations 1010 and 1020. In another example, one of computer systems 1510-1522 and access servers 9010-9012 can provide the token to wireless AP 1230. For instance, wireless AP 1230 can be the registrar for the WLAN at location 1030. In one or more embodiments, the network provider can determine a location of the first MD and may only provide the token to a registrar associated with the location of the first MD.

At 10070, the token can be provided to the first MD. In one example, one of computer systems 1510-1522 and access servers 9010-9012 can provide the token to the first MD via network 1410. In one instance, the token can be provided to the first MD via a SMS message. For example, one of computer systems 1510-1522 and access servers 9010-9012 can provide the token to messaging server 9051, and messaging server 9051 can provide the token to the first MD via a SMS message. In a second instance, the token can be provided to the first MD via a network socket connection (e.g., a TCP/IP socket, a UDP/IP socket, etc.). In another instance, an operator (e.g., an employee or associate of a network provider) can provide the token to the first MD via voice (e.g., speaking the token to a user of the first MD) and/or via sending the first MD a SMS message (e.g., by way of messaging server 9051).

At 10080, one or more enrollee hash values, based on the token, can be received from a second MD. For example, a first hash value of the one or more enrollee hash values can be based on a first half of the token, and a second hash value of the one or more enrollee hash values can be based on a second half of the token. In one or more embodiments, the first hash value and the second hash value can be included in E-Hash1 and E-Hash2, respectively, of a third WPS RP message (e.g., M3 of WPS RP messages M1-M8) illustrated in FIG. 11. In one or more embodiments, if a length N of the token is an odd number, then a first length of the first half of the token can be 1+N/2, and a second length of the second half of the token can be N/2. In one example, the token can include an odd number of characters. In another example, the token can include a format of UTF-8 (8-bit Unicode Transformation Format) that can result in the length of the token being an odd number.

At 10090, one or more verification hash values based on the token can be calculated. At 10100, it can be determined whether or not the one or more verification hash values match respective one or more enrollee hash values. If the one or more verification hash values do not match the respective one or more enrollee hash values, the method can proceed to 10110, where information can be sent to the second MD indicating that access to a WLAN (e.g., the wireless network secured with the at least one network encryption key) is not permitted. If the one or more verification hash values match the respective one or more enrollee hash values, the method can proceed to 10120. In one or more embodiments, determining that the one or more verification hash values match the respective one or more enrollee hash values can be used to identify the user and/or the user account. For example, the user account, identified via the token, can be charged an amount (e.g., an amount of money) for usage of the WLAN and/or the wireless AP.

At 10120, configuration data can be provided to one or more wireless APs. In one example, a registrar (e.g., NMD 1610) can provide configuration data to one or more wireless APs (e.g., one or more of wireless APs 1210-1220). For instance, wireless APs 1210 and 1211 can implement a WLAN at location 1010, and NMD 1610 can provide, to wireless APs 1210 and 1211, configuration data that can include a WPA password that is utilizable in communications with the second MD.

At 10130, configuration data can be provided to the second MD. For example, the registrar (e.g., NMD 1610, wireless AP 1230, etc.) can provide the configuration data to the second MD. For instance, the second MD can utilize the configuration data to communicate with the WLAN and/or one or more wireless APs. In one or more embodiments, the configuration data can include one or more WLAN settings (e.g., SSID, etc.) and an encryption key that is usable by the second MD to access the WLAN. For example, the encryption key included in the configuration data can be or include a WPA password. In one or more embodiments, the encryption key that is usable by the second MD to access the WLAN can expire after an amount of time transpires, and after the amount of time transpires, the encryption key that is no longer usable by the second MD to access the WLAN. In one example, the encryption key can expire after one hour transpires. In another example, the encryption key can expire after a calculated amount of time transpires. For instance, the calculated amount of time can be from a current time (e.g., now) to a time in the future (e.g., 10:00 A.M. tomorrow).

In one or more embodiments, the configuration data can include one or more settings for the second MD. In one example, the one or more settings can include one or more security settings. For instance, the one or more security settings can include one or more of a security protocol (e.g., TLS, IPSec, SSL, AES (Advanced Encryption Standard), Blowfish, RSA, Diffie-Hellman, etc.), a VPN tunnel termination address, an encryption key (e.g., a public encryption key), and an encryption key length (e.g., 56-bit, 64-bit, 128-bit, 256-bit, etc.), among others.

At 10140, an ACL can be modified. For example, ACL 5410 of NMD can be modified such that the second MD can access network 1420. In one or more embodiments, further authentication can be performed before the ACL can be modified. In one example, a username and a password can be authenticated by a first network provider before the ACL can be modified. In another example, a username and a password can be authenticated by a second network provider before the ACL can be modified.

For instance, the first network provider, that manages and/or controls the WLAN and/or access to network 1420, may allow user accounts associated with the second network provider to roam on its WLANs, and the first network provider can utilize one or more AAA methods and/or systems of the first network provider and the second network provider to authenticate the username and the password before the ACL is be modified. For example, the first network provider can provide the username and the password (or a variation of the password, e.g., using challenge-handshake authentication protocol (CHAP)) to a RADIUS server associated with the second network provider to determine whether or not the username and the password are authenticated.

In one or more embodiments, an AAA server can provide one or more network settings, for the second MD, that can be used in modifying the ACL. For example, a profile can be associated with the user account, and the profile can include one or more network settings. For instance, the one or more network settings can include one or more of a QoS, a network service (e.g., WWW, email, DNS, etc.), a quantity of communications (e.g., a number of bytes per login session), and a subnet (e.g., a subnet that is accessible by the second MD), among others.

At 10150, access to a wide area network can be permitted. In one example, NMD 1610 can provide access control from one or more MDs coupled to one or more of wireless APs 1210-1220 to network 1420, and NMD 1610 can permit access of the one or more MDs coupled to one or more of wireless APs 1210-1220 to network 1420. For instance, the access to the wide area network can be based on an ACL of NMD 1610 (e.g., modified at 10140). In another example, wireless AP 1230 can provide access control from one or more MDs coupled to wireless AP 1230 to network 1420, and wireless AP 1230 can permit access of the one or more MDs coupled to wireless AP 1230 to network 1420. For instance, the access to the wide area network can be based on an ACL of wireless AP 1230 (e.g., modified at 10140).

Figure 11:
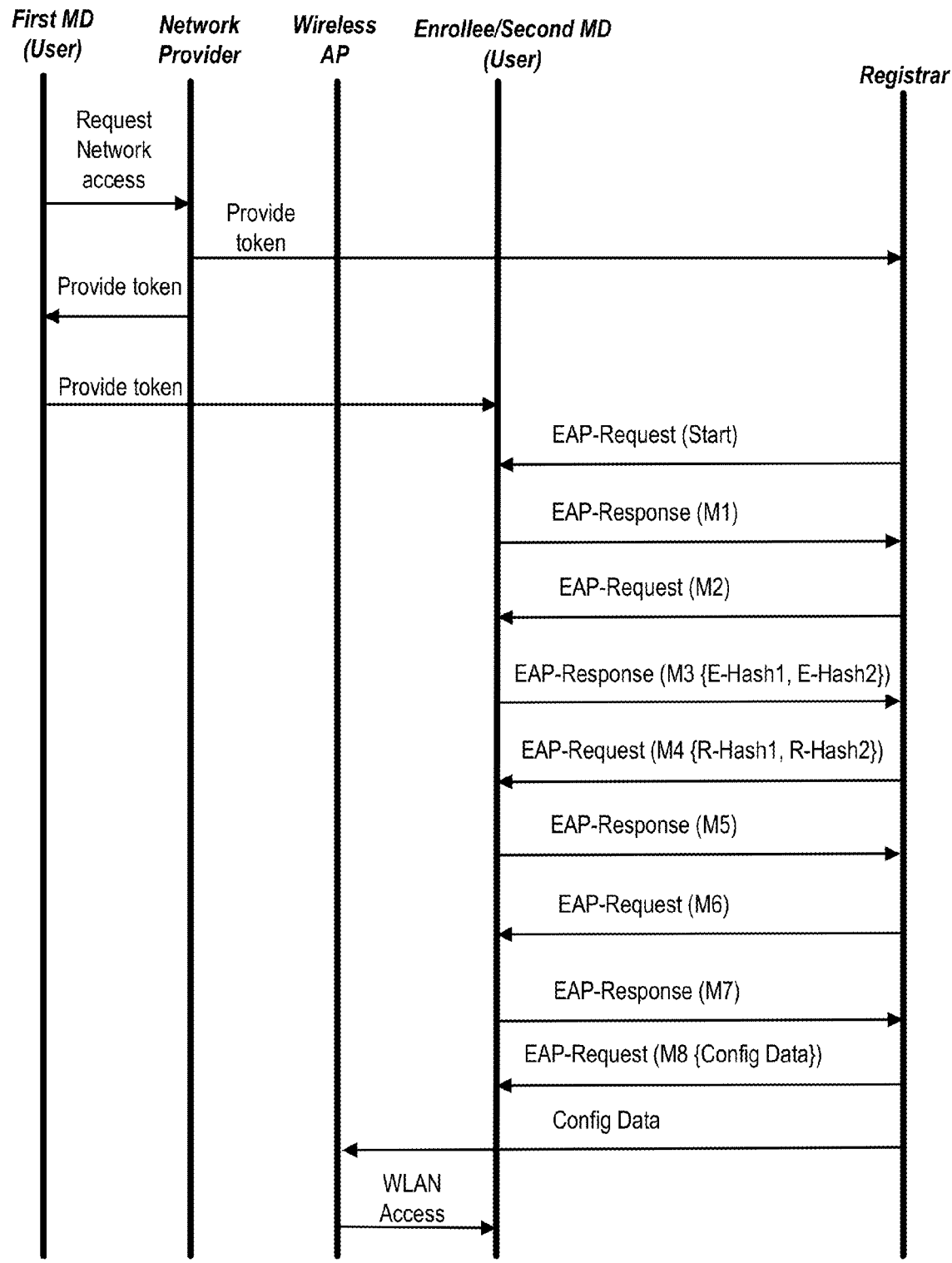
FIG. 11 illustrates a sequence diagram of providing access to a wireless network, according to one or more embodiments.

Turning now to FIG. 11, a sequence diagram of providing access to a wireless network is illustrated, according to one or more embodiments. As shown in the sequence diagram, a user of a first MD (e.g., MD 1113) can request network access (e.g., access of a WLAN and/or wide area network) of a network provider. In one or more embodiments, the user can provide authentication information in the request.

In one example, the network provider can be a first network provider that operates and/or controls a WLAN (e.g. a WLAN available at location 1010). In another example, the network provider can be a second network provider that has a relationship with the first network provider that operates and/or controls a WLAN (e.g. a WLAN available at location 1010). For instance, the relationship can allow users associated with user accounts of the second network provider to access and/or use one or more WLANs provided and/or controlled by the first network provider.

As illustrated, the network provider can provide a token to a registrar and the first MD. As shown, the user and/or the first MD can provide the token to the Enrollee or second MD (e.g., MD 1115). In one example, the first MD can be coupled to the second MD, and the first MD can provide the token to the second MD. In another example, the user of the first MD can provide the token to the second MD. For instance, the user can type the token into a keyboard of the second MD.

In one or more embodiments, the registrar and the enrollee/second MD can participate in multiple EAP message exchanges. As illustrated, the registrar and the enrollee/second MD can exchange messages M1-M8. In one or more embodiments, the registrar and the enrollee/second MD can exchange messages M1-M8 via the WLAN and/or at least one wireless AP that implements the WLAN. For example, the registrar and the enrollee/second MD can exchange messages M1-M8 via an unencrypted and/or unsecured portion of the WLAN. For instance, the at least one wireless AP that implements the WLAN may only provide unencrypted and/or unsecured communications from one or more MDs and the registrar. In one or more embodiments, since wireless communications, via the at least one wireless AP, between the enrollee/second MD and the registrar are unencrypted and/or unsecured, the configuration data included in message M8 can be encrypted. For example, the configuration data included in message M8 can be encrypted using a public encryption key of the enrollee/second MD.

In one or more embodiments, messages M1-M8 can be associated with and/or implemented in accordance with a WPS specification (e.g., a Wi-Fi Protected Setup Specification version 1.0 h available from the Wi-Fi Alliance Corporation). As shown, message M3 can include E-Hash1 and E-Hash2. For example, E-Hash1 can be based on a first half of the token, and E-Hash2 can be based on a second half of the token. In one or more embodiments, the registrar can use E-Hash1 and E-Hash2 to determine that the enrollee/second MD is in possession of the token.

As illustrated, message M4 can include R-Hash1 and R-Hash2. For example, R-Hash1 can be based on a first half of the token, and R-Hash2 can be based on a second half of the token. In one or more embodiments, the enrollee/second MD can use R-Hash1 and R-Hash2 to determine that the registrar is in possession of the token. For example, determining that the registrar is in possession of the token can be useful in preventing and/or thwarting a man-in-the-middle attack.

As shown, message M8 can include configuration data. For example, the configuration data can include one or more WLAN settings (e.g., SSID, etc.) and an encryption key that is usable by the enrollee/second MD to access the WLAN. As illustrated, the registrar can provide the configuration data to a wireless AP (e.g., wireless AP 1210). For example, the wireless AP can support multiple encryption keys (e.g., an encryption key for each MD accessing the WLAN). In one or more embodiments, the registrar can provide the configuration data to multiple wireless APs (e.g., two or more of wireless APs 1210-1220). For example, wireless APs 1210 and 1211 can implement the WLAN at location 1010, and the enrollee/second MD can seamlessly use either of wireless APs 1210 and 1211 in accessing the WLAN at location 1010.

In one or more embodiments, a single MD can be the first computing device and the second computing device in the method illustrated in FIG. 10 and in the sequence diagram illustrated in FIG. 11. For example, MD 1110 can be the first computing device and the second computing device in the method illustrated in FIG. 10 and in the sequence diagram illustrated in FIG. 11.

Figure 12:
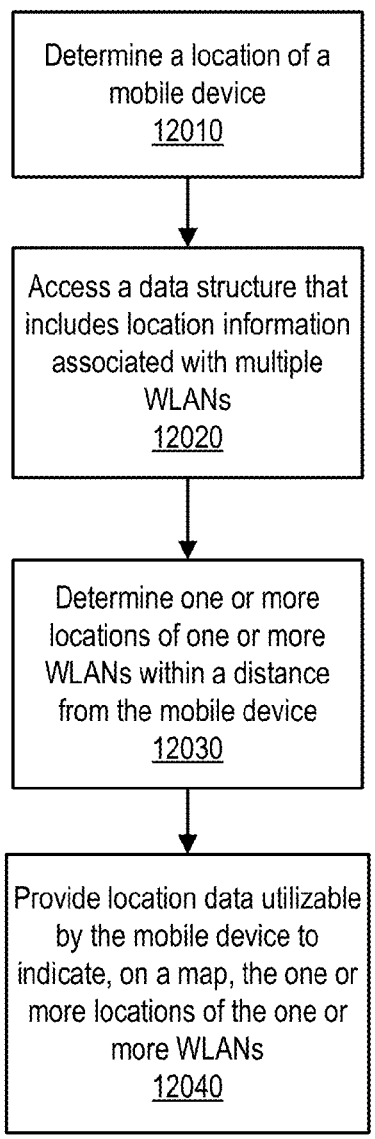
FIG. 12 illustrates a method of providing location information associated with one or more wireless networks, according to one or more embodiments.

Turning now to FIG. 12, a method of providing location information associated with one or more wireless networks is illustrated, according to one or more embodiments. At 12010, a location of a MD can be determined. For example, one or more of computer systems 1510-1522 and access servers 9010-9012 can determine a location of a MD (e.g., a MD from MDs 1111, 1112, 1121, and 1131). For instance, location 1050 can be determined for MD 1112. At 12020, a data structure can be accessed that includes location information associated with multiple WLANs. For example, one or more of databases 9040 and 9041 can include respective one or more tables that can include location information associated with multiple WLANs. For instance, database 9040 can include a table that stores geographic location information associated with one or more of locations 1010-1030 and corresponding one or more WLANs that are available at the one or more of locations 1010-1030.

At 12030, one or more locations of corresponding one or more WLANs within a distance of the MD can be determined. In one example, one or more of computer systems 1510-1522 and access servers 9010-9012 can determine, based on the location of the MD and the geographic location information associated with one or more of locations 1010-1030 within the distance of the MD (e.g., one or more of location 1010-1030 within a few miles of the location of the MD, one or more of locations 1010-1030, one or more of location 1010-1030 within tens of miles of the location of the MD, etc.)

At 12040, location data can be provided to the MD, where the location data is utilizable by the MD to indicate (e.g., indicate on a map) the one or more locations of corresponding one or more WLANs within the distance of the MD. For example, one or more of computer systems 1510-1522 and access servers 9010-9012 can provide the location data to the MD. In one or more embodiments, a data description language can be used to provide the location data to the MD.

For example, the data description language can include an extensible markup language (XML).

Figure 14:
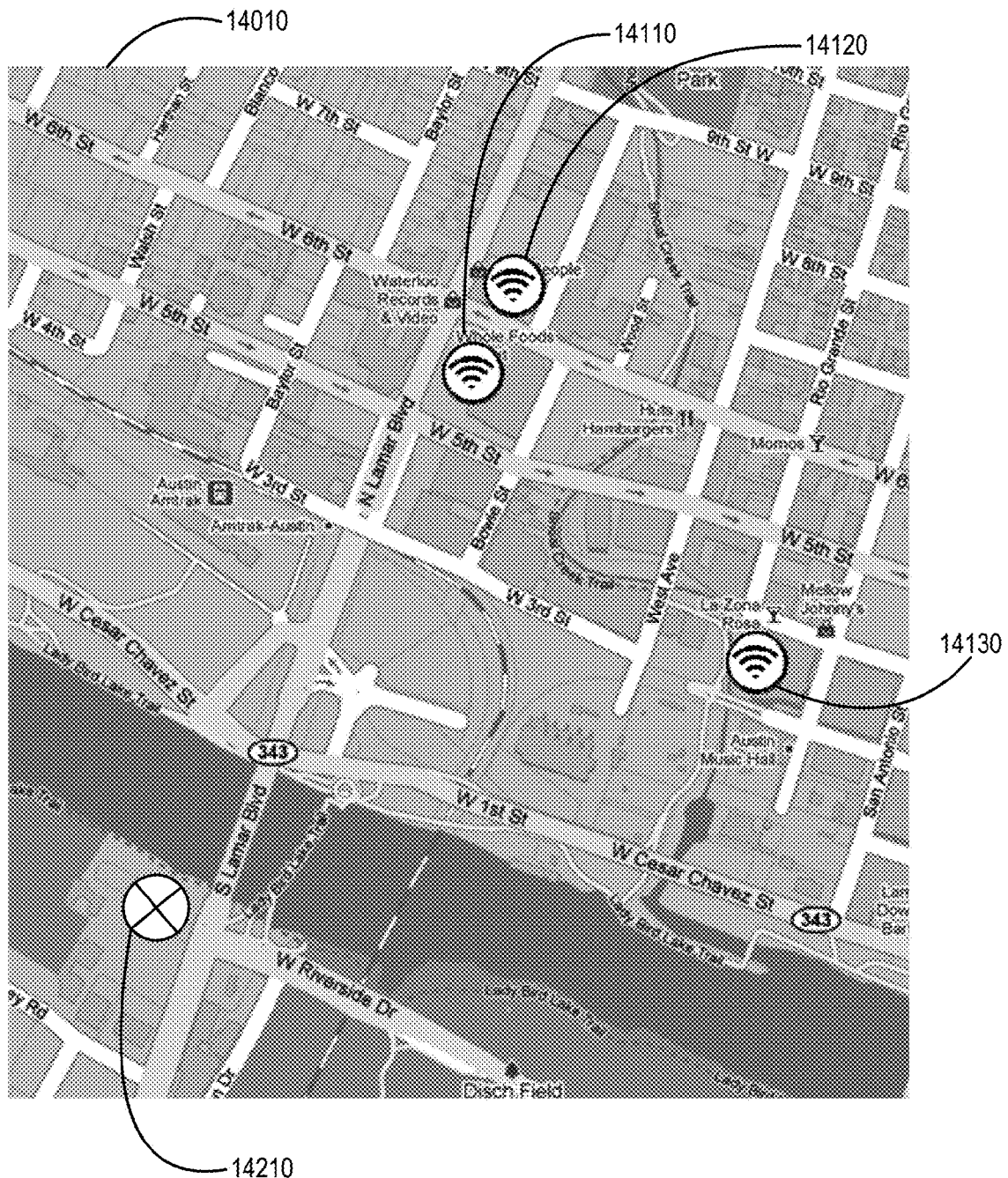
FIG. 14 provides an exemplary map indicating one or more locations where access to one or more wireless networks is possible, according to one or more embodiments.
Figure 15:
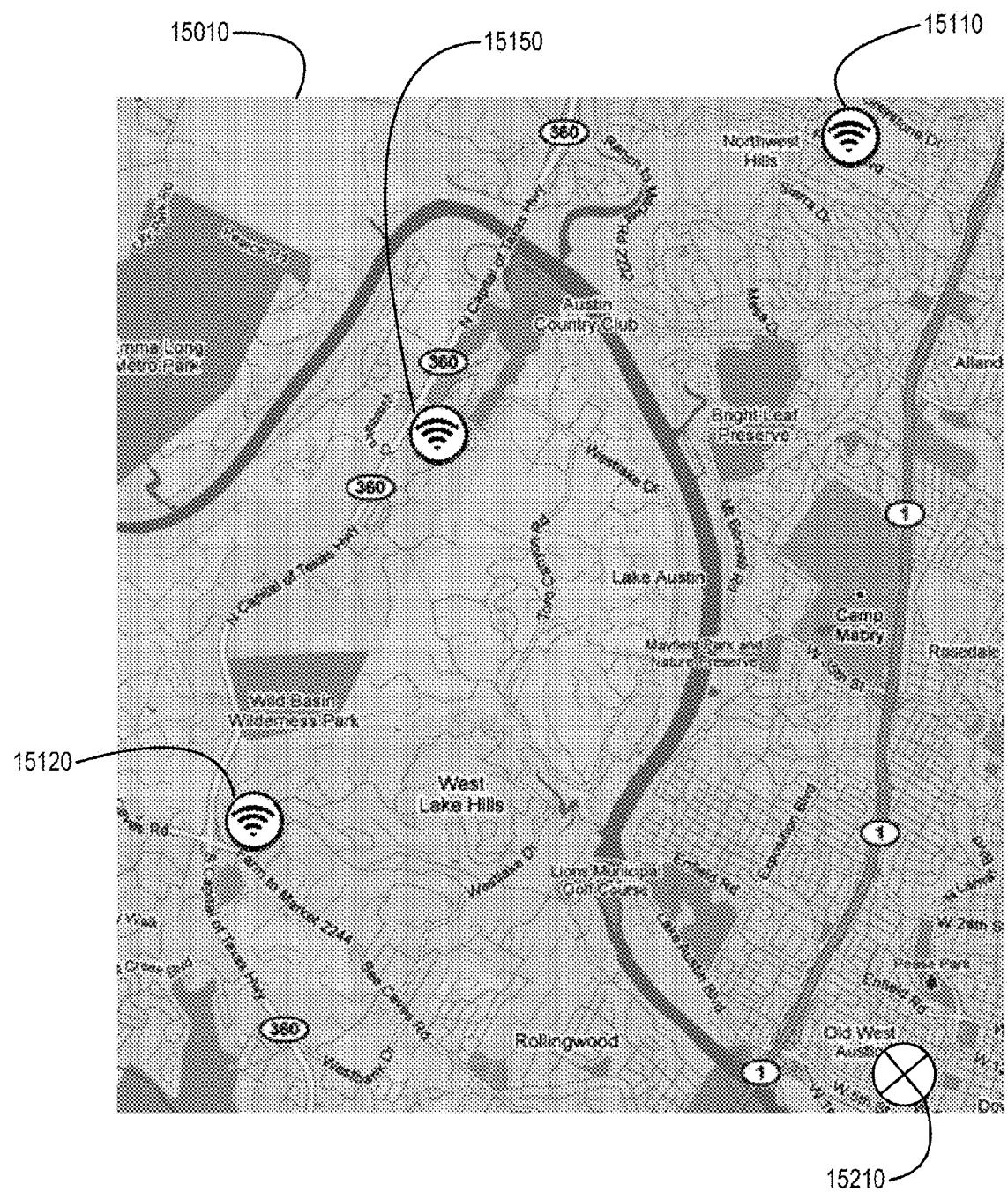
FIG. 15 provides an exemplary map indicating one or more locations where access to one or more wireless networks is possible, according to one or more embodiments.

In one or more embodiments, the MD can utilize the location data to produce a map indicating the one or more locations of corresponding one or more WLANs within the distance of the MD. For example, the MD can utilize the location data to produce the map that can be displayed via display 4046. In one instance, APP 4070 can receive the location data, produce a map 14010 of FIG. 14 that indicates, via one or more of icons 14110-14130, the one or more locations of corresponding one or more WLANs within the distance (e.g., a few miles) of the MD indicated via icon 14210. In another instance, APP 4070 can receive the location data, produce a map 15010 of FIG. 15 that indicates, via one or more of icons 15110-15130, the one or more locations of corresponding one or more WLANs within the distance (e.g., tens of miles) of the MD indicated via icon 15210.

Figure 13:
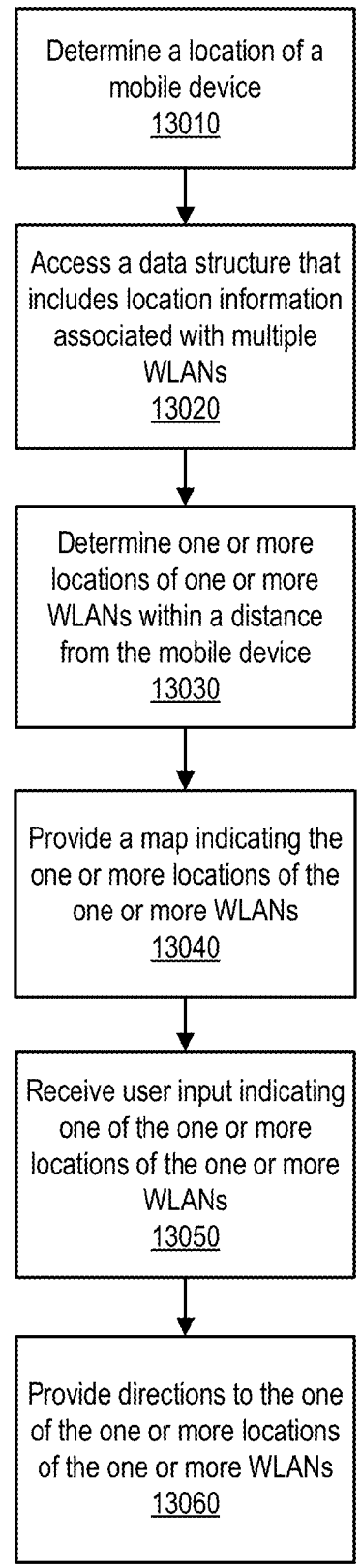
FIG. 13 illustrates a method of providing location information associated with one or more wireless networks, according to one or more embodiments.

Turning now to FIG. 13, a method of providing location information associated with one or more wireless networks is illustrated, according to one or more embodiments. In one or more embodiments, method elements 13010-13030 can be performed with reference to method elements 12010-12030 of FIG. 12. At 13040, a map that indicates the one or more locations of corresponding one or more WLANs within the distance of the MD can be provided to the MD. For example, one or more of computer systems 1510-1522 and access servers 9010-9012 can provide, to the MD, the map that indicates the one or more locations of corresponding one or more WLANs within the distance of the MD. For instance, one or more of maps 14010 and 15010 of FIGS. 14 and 15, respectively, can be provided to the MD.

In one or more embodiments, providing the map that indicates the one or more locations of corresponding one or more WLANs within the distance of the MD can include generating the map. In one example, the map can include a graphic file. For instance, the graphics file can include a graphics format such as a graphics format of PNG, JPEG, GIF, TIFF, or BMP, among others. In another example, the map can include a document file. For instance, the document file can include a Microsoft® Word document (Microsoft® is a registered trademark of Microsoft Corporation in the United States and/or other countries), a PostScript document, or a PDF (Portable Document Format) document, among others. In one or more embodiments, the MD can receive the map and display the map via display 4046.

At 13050, user input indicating a selected location of the one or more locations of corresponding one or more WLANs within the distance can be received. For example, one or more of computer systems 1510-1522 and access servers 9010-9012 can receive user input data from the MD that indicates the selected location. For instance, the user of the MD can select an icon of icons 14110-14130 or 15110-15150 displayed via display 4046, and the one or more of computer systems 1510-1522 and access servers 9010-9012 can receive the user input data from the MD that indicates a selected location corresponding to a selected icon.

At 13060, directions to the selected location can be provided to the MD. For example, one or more of computer systems 1510-1522 and access servers 9010-9012 can provide, to the MD, turn-by-turn directions to the selected location. In one or more embodiments, the directions to the selected location can be updated as the MD travels to the selected location.

In one or more embodiments, additional information associated with the selected location can be provided to the MD. In one example, a description associated with the location can be provided to the MD. For instance, the description can include one or more of a name of an establishment (e.g. Star Bucks, Whole Foods, Holiday Inn, Union Station, Austin-Bergstrom International Airport, La Zona Rosa, Barnes & Noble, etc.), services and/or products offered, and hours of operations, among others.

In one or more embodiments, the term "memory medium" can mean a "memory" and/or "tangible computer readable medium" which is intended to include various types of memory or storage, including an installation medium, e.g., a CD-ROM, or floppy disks, a random access memory or computer system memory such as DRAM, SRAM, EDO RAM, a Rambus® memory (Rambus® is a registered trademark of Rambus, Inc.) RAM, NVRAM, EPROM, EEPROM, flash memory etc., and/or a non-volatile memory such as a magnetic media, e.g., a hard drive, and/or optical storage. The memory medium can include other types of memory as well, or combinations thereof. In one or more embodiments, the memory medium can be and/or include an article of manufacture and/or a software product that stores instructions executable by a processor to implement one or more methods and/or processes described herein. In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network).

In one or more embodiments, each of the systems described herein may take various forms, including a personal computer system, server computer system, workstation, network appliance, Internet appliance, wearable computing device, PDA, laptop, mobile telephone, mobile multimedia device, embedded computer system, television system, and/or other device. In general, the terms "computing device", "computer", and/or "computer system" can be broadly defined to encompass any device having a processor which executes instructions from a memory medium. A CPU or processing unit in one or more systems executing code and data from a memory medium includes a means for executing one or more software program according to the methods and/or flowcharts described herein.

It is noted that, in one or more embodiments, one or more of the method elements described herein and/or one or more portions of an implementation of a method element can be performed in varying orders, can be repeated, can be performed concurrently with one or more of the other method elements and/or one or more portions of an implementation of a method element, or can be omitted. Additional and/or duplicated method elements can be performed as desired. For example, a process and/or method can perform one or more described method elements concurrently with duplicates of the one or more described method elements. For instance, multiple methods, processes, and/or threads can be implemented using same described method elements.

In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method comprising:
   receiving, by a computing system of a first wireless network from a first device, a request to access a second wireless network secured with a network encryption key, wherein the first wireless network is different than the second wireless network;
   in response to a determination that a user account associated with the first device permits access to the second wireless network, sending, from the computing system to a registration device distinct from the first device, a token usable by a second device to access the network encryption key; and
   sending the token to the second device, via the first wireless network and the first device, wherein possession of the token by the second device enables the second device to send a hash value based on the token to the registration device via the second wireless network, and wherein the hash value enables the registration device to provide access to the network encryption key to the second device.

2. The method of claim 1, wherein the registration device provides the second device access to a wide area network via the second wireless network based on network settings provided by the registration device to an access point.

3. The method of claim 2, wherein the wide area network comprises the internet.

4. The method of claim 2, wherein the network settings include a security protocol, a virtual private network tunnel termination address, an encryption key length, or a combination thereof.

5. The method of claim 2, wherein the network settings indicate a quality of service to be provided to the second device via the second wireless network, a network service to be provided to the second device via the second wireless network, a quantity of communications to be provided to the second device via the second wireless network, an address accessible by the second device via the second wireless network, or a combination thereof.

6. The method of claim 2, wherein the network settings include an expiration time for access to the wide area network.

7. The method of claim 6, wherein the access point operates in compliance with at least a portion of an Institute of Electrical and Electronics Engineers 802.11 specification or at least a portion of an Institute of Electrical and Electronics Engineers 802.16 specification.

8. The method of claim 6, wherein the access point includes the registration device.

9. The method of claim 1, wherein the token includes a device password.

10. The method of claim 1, wherein a user name and password associated with the user account are received from the second device and authenticated before the registration device permits the second device to access a wide area network via the second wireless network, and wherein the user name and password are different from the token.

11. The method of claim 10, wherein an authentication server authenticates the user name and password.

12. The method of claim 1, wherein the user account is charged a fee based on the second device accessing the second wireless network.

13. The method of claim 1, wherein the token is sent to the first device via a simple message service message.

14. The method of claim 1, wherein the token is sent to the first device via a voice call.

15. A computer-readable memory device storing instructions executable by a processor to perform operations comprising:
   receiving, via a first wireless network from a first device, a request to access a second wireless network secured with a network encryption key, wherein the first wireless network is different than the second wireless network;
   in response to a determination that a user account associated with the first device permits access to the second wireless network, sending a token to a registration device distinct from the first device, the token usable by a second device to access the network encryption key; and
   sending the token to the second device, via the first wireless network and the first device, wherein possession of the token by the second device enables the second device to send hash values based on the token to the registration device via the second wireless network, and where the hash values enable the registration device to provide access to the network encryption key to the second device.

16. The computer-readable memory device of claim 15, wherein the registration device provides the second device access to a wide area network via the second wireless network based on network settings provided to an access point.

17. The computer-readable memory device of claim 15, wherein the hash values include a first hash value based on a first portion of the token and a second hash value based on a second portion of the token.

18. A system comprising:
   a processor; and
   a memory device accessible to the processor, the memory device storing instructions executable by the processor to cause the processor to perform operations comprising:
      receiving, via a first wireless network from a first device, a request to access a second wireless network secured with a network encryption key, wherein the first wireless network is different from the second wireless network;
      in response to a determination that a user account associated with the first device permits access to the second wireless network, sending a token to a registration device distinct from the first device, the token usable by a second device to access the network encryption key; and sending the token to the second device, via the first wireless network and the first device, wherein possession of the token by the second device enables the second device to send a hash value based on the token to the registration device via the second wireless network, and wherein the hash value enables the registration device to provide access to the network encryption key to the second device.

19. The system of claim 18, wherein the registration device resides at a network management device coupled to a wide area network and coupled to a particular wireless access point of the second wireless network, wherein the network management device is configured to use an access control list to control access to the second wireless network, and wherein the network management device is configured to modify the access control list based on network settings associated with the user account.

20. The system of claim 18, wherein the registration device resides at multiple wireless access points of the second wireless network, wherein the wireless access points are configured to use an access control list to control access to the second wireless network, and wherein the wireless access points are configured to modify the access control list based on network settings associated with the user account.

* * * * *